United States Patent
Chiu et al.

(10) Patent No.: US 11,900,340 B1
(45) Date of Patent: Feb. 13, 2024

(54) ACCESS CONTROLS FOR A DECENTRALIZED NETWORK

(71) Applicant: Block, Inc., San Francisco, CA (US)

(72) Inventors: Emily Chiu, San Francisco, CA (US); Daniel Buchner, Woodinville, WA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 18/194,562

(22) Filed: Mar. 31, 2023

Related U.S. Application Data

(63) Continuation of application No. 18/090,039, filed on Dec. 28, 2022, now Pat. No. 11,790,334.

(Continued)

(51) Int. Cl.
*G06Q 20/38* (2012.01)
*G06Q 20/10* (2012.01)
(Continued)

(52) U.S. Cl.
CPC ......... *G06Q 20/10* (2013.01); *G06Q 20/3678* (2013.01); *G06Q 20/381* (2013.01);
(Continued)

(58) Field of Classification Search
CPC .. G06Q 20/10; G06Q 20/3678; G06Q 20/381; G06Q 20/3821; G06Q 20/3827; G06Q 20/3829; G06Q 20/389; G06Q 20/4016; G06Q 20/42; G06Q 30/0611; G06Q 2220/00

(Continued)

(56) References Cited

U.S. PATENT DOCUMENTS 11,410,214 B2 * 8/2022 Tardiou ............... H04L 9/50
2018/0341910 A1 * 11/2018 Broveleit ............. G06Q 50/28
(Continued)

FOREIGN PATENT DOCUMENTS

WO WO-2021016311 A1 * 1/2021 ............ G06F 21/32

OTHER PUBLICATIONS

Microsoft, "Decentralized identity and verifiable credentials", Sep. 28, 2022, 11 pages (Year: 2022).*

(Continued)

*Primary Examiner* — James D Nigh
(74) *Attorney, Agent, or Firm* — FIG. 1 Patents

(57) ABSTRACT

A decentralized node may generate a network of decentralized nodes individually configured to store, receive, and transmit data based on rules associated with the decentralized nodes. A decentralized node may associate a decentralized identity of an entity with a select decentralized node of the decentralized nodes. A decentralized node may present a user interface including one or more access controls at a edge device, the access controls configuring rules to be applied to third-party access and modification of decentralized identity data associated within the decentralized identity of the entity and stored at the selected decentralized node. A decentralized node may identify the decentralized identity data accessible to the select decentralized node based on the rules. A decentralized node may store the decentralized identity data within the decentralized identity associated with the entity at the select decentralized node.

20 Claims, 21 Drawing Sheets

Related U.S. Application Data

(60) Provisional application No. 63/348,571, filed on Jun. 3, 2022.

(51) Int. Cl.
*G06Q 20/36* (2012.01)
*G06Q 20/40* (2012.01)
*G06Q 20/42* (2012.01)
*G06Q 30/0601* (2023.01)

(52) U.S. Cl.
CPC ....... *G06Q 20/389* (2013.01); *G06Q 20/3821* (2013.01); *G06Q 20/3827* (2013.01); *G06Q 20/3829* (2013.01); *G06Q 20/4016* (2013.01); *G06Q 20/42* (2013.01); *G06Q 30/0611* (2013.01); *G06Q 2220/00* (2013.01)

(58) Field of Classification Search
USPC .......................................................... 705/69
See application file for complete search history.

(56) References Cited

U.S. PATENT DOCUMENTS

| | | | |
|---|---|---|---|
| 2019/0230092 A1* | 7/2019 | Patel | H04L 9/3247 |
| 2019/0385215 A1* | 12/2019 | Ferenczi | G06Q 20/12 |
| 2020/0296140 A1* | 9/2020 | Buchner | H04L 63/205 |
| 2020/0302263 A1* | 9/2020 | Douek | G06N 20/00 |
| 2020/0320207 A1* | 10/2020 | Beno | G06F 21/64 |
| 2022/0261882 A1* | 8/2022 | Youb | G06Q 20/065 |
| 2022/0414237 A1 | 12/2022 | Lally et al. | |
| 2023/0015535 A1* | 1/2023 | Smeltzer | G06Q 30/08 |
| 2023/0083642 A1* | 3/2023 | Saginawa | G06F 21/6245 726/27 |

OTHER PUBLICATIONS

"Decentralized Identity" Retrieved from <https://ethereum.org/en/decentralized-identity/> Jun. 29, 2023, 14 pages (Year: 2023).
"How is a state machine different than any other computer program?", Software Engineering Stack Exchange, 2015, 5 pages.

* cited by examiner

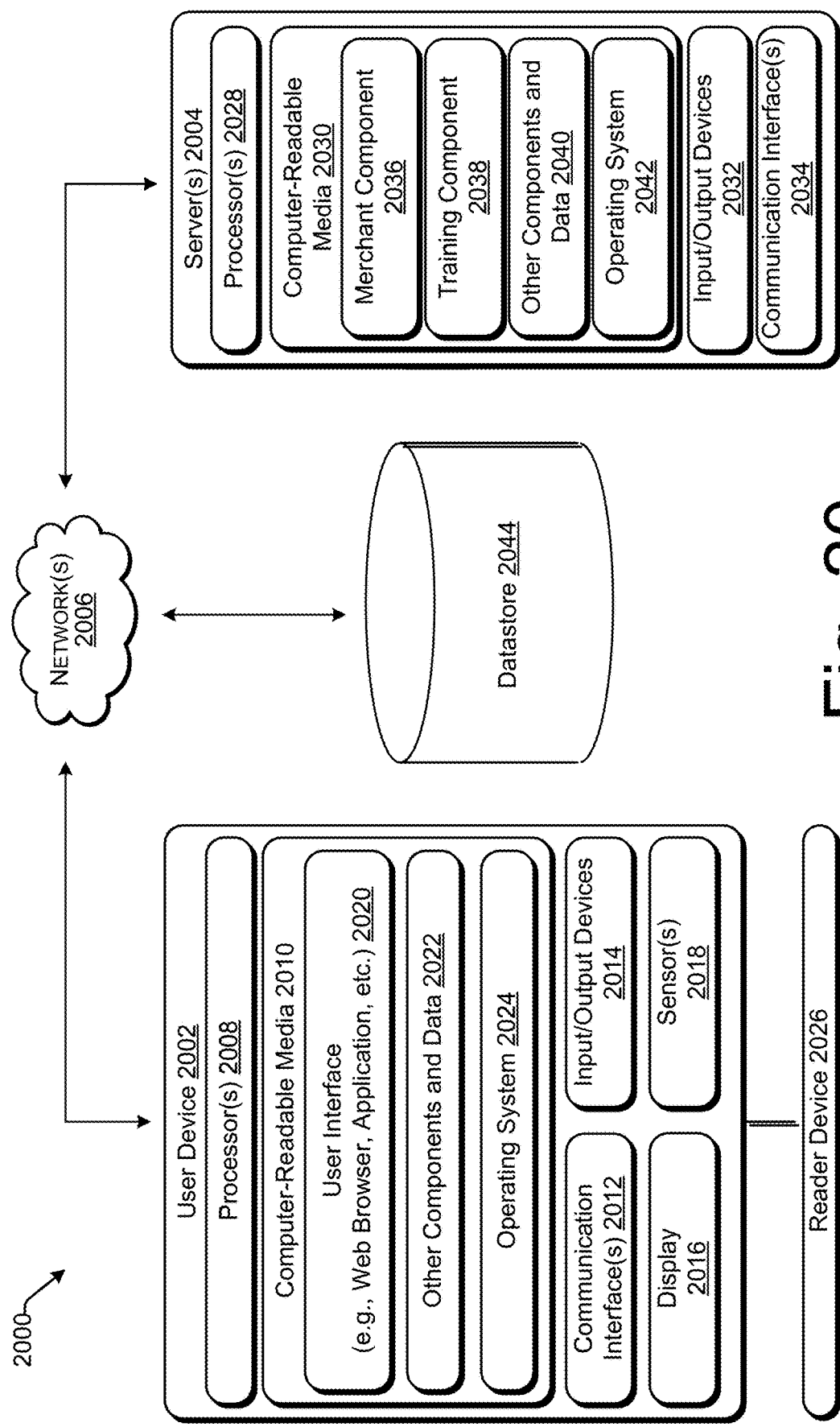

ACCESS CONTROLS FOR A DECENTRALIZED NETWORK

RELATED APPLICATIONS

This Application claims priority under 35 U.S.C. § 119(e) to U.S. Provisional Application No. 63/348,571, filed Jun. 3, 2022 and under 35 U.S.C. § 120 to U.S. patent application Ser. No. 18/090,039, filed Dec. 28, 2022 and titled "Blockchain Supported Resource Transfer Protocol," the entire disclosures of each of which are hereby incorporated by reference.

TECHNICAL FIELD

Decentralized networks provide a variety of functionality in connection with implementing and securely transferring various digital assets, examples of which include cryptocurrencies, such as tokens for decentralized web applications implemented as part of a distributed state machine. Additional functionality has been developed that leverages decentralized networks.

BRIEF DESCRIPTION OF THE DRAWINGS

One or more embodiments of the disclosed technologies are illustrated by way of example and are not limited by the figures of the accompanying drawings, in which like references indicate similar elements.

FIG. 20 is a block diagram showing a system for performing techniques described herein with which techniques described herein can be implemented, according to an embodiment described herein.

DETAILED DESCRIPTION

Figure 1:
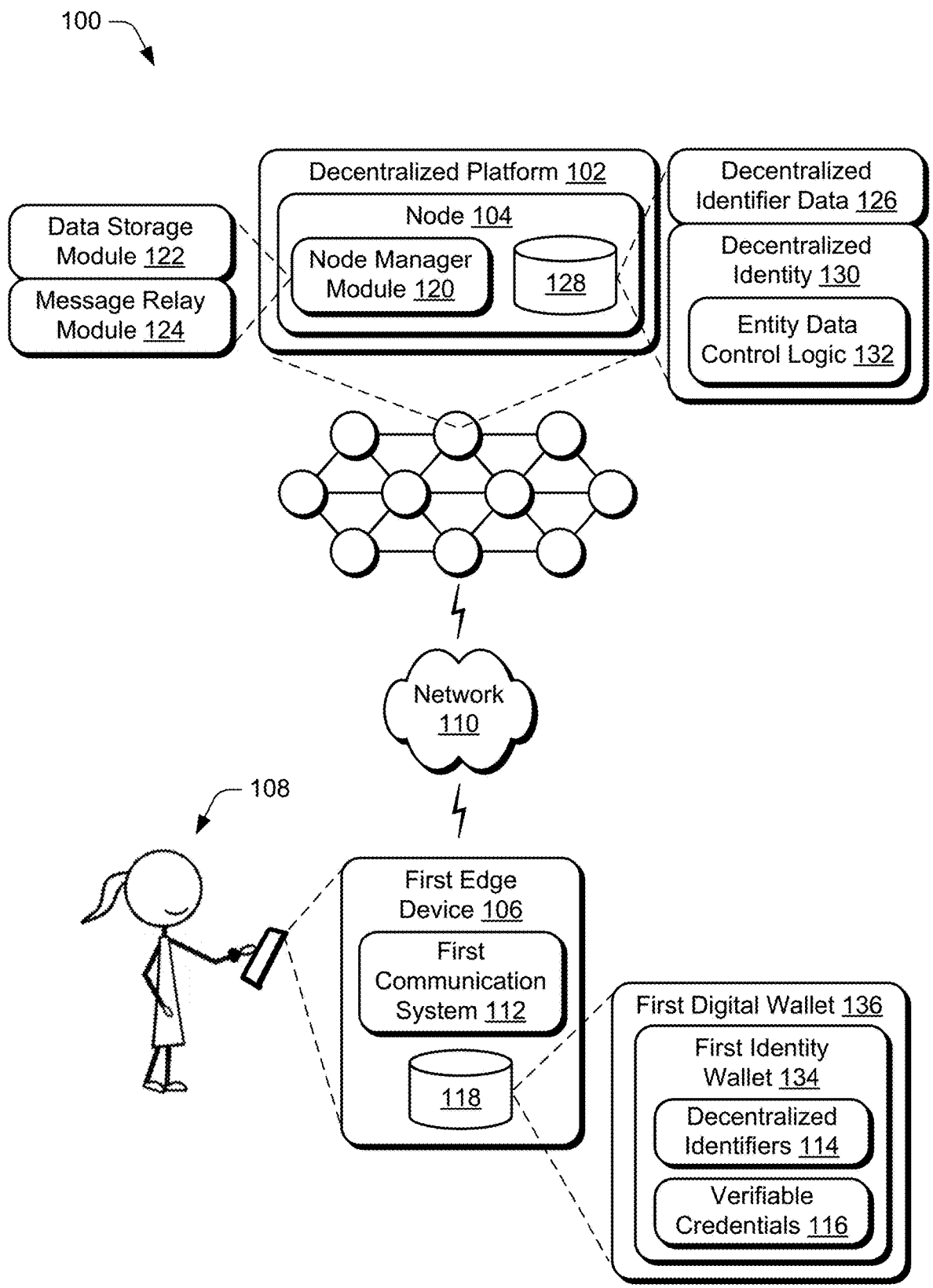
FIG. 1 is a non-limiting illustration of an example system that is operable to implement access control techniques for a decentralized network as described herein according to an implementation of the present subject matter.

Identity of an entity (i.e., a user's identity) is typically implemented and managed at a digital service platform (e.g., social media network) with little or no visibility as to (1) what is being stored and (2) to whom the identity and characteristics associated with the identity are shared. Consequently, mechanisms are not available to the entity using conventional techniques to determine an accuracy of the entity's identity as maintained by the digital service platform nor how that potentially inaccurate data is utilized both by the digital service platform that collected the information as well as other systems that have shared that information. Leaving the outcome of the entity's data to the digital service platform, and any third parties that the digital service platform has shared the entity's data with, also presents uncontrollable security risks for exposure of the entity's data.

To solve these technical problems, decentralized identity techniques and systems are implemented. In a first example, a decentralized identity is implemented to provide an entity (e.g., a user) with an ability to control what information is associated with the entity and how that information is shared, e.g., with third-party service provider systems. In a second example, the decentralized identity supports mechanisms usable to control how the information is shared between the third-party service provider systems.

Continuing with the discussion of the first example, the decentralized identity techniques are implemented to "make your personal data your own." To do so, user interfaces are configured to support user inputs that specify what characteristics are stored as part of a decentralized identity maintained at a decentralized node associated with a decentralized identity, e.g., a personal datastore. The decentralized identity data maintained by the decentralized identity is provided in a variety of ways, examples of which include frontloading information, collecting information over time through monitored interactions by an identity wallet executed on an edge device associated with the identity, providing third-party access, and so forth.

Entry of the data, for instance, may be "gamified" (e.g., swipe left/right) using preset options to input desired criteria. In another example, an upload application programming interface is made available to permit third-party access to supplement the decentralized identity data. An entity associated with the decentralized identity is then provided with a user interface to review the uploaded data, and if acceptable, publish the data for inclusion as part of the decentralized identity. Review and dissemination provides the entity with a degree of control as to "what" is included as part of the decentralized identity.

In one example, the user interface also includes options usable to control how the decentralized identity data is shared from the decentralized identity. These options, for instance, are configurable to specify particular types of data to be exposed via respective ones of a plurality of application programming interfaces (APIs). The user interface is configurable, for instance, to specify access to medical records via a medical records API, food and wine preferences via a respective dining API, user and financial credentials via a credit API (e.g., for a point-to-point financial system), music preferences via a media-sharing API, and so forth. Machine-learning techniques are also usable to aid in the collection process, e.g., to resolve ambiguities in assigning particular types of data to respective APIs. In an implementation, the APIs are accessible, respectively, via respective distributed identifiers, e.g., as implemented by a decentralized platform using a plurality of nodes.

In this way, the decentralized identity provides the entity with an ability to control what characteristics are shared. Controlled sharing also supports improved security for the entity's information, such as personally identifiable information in contrast to conventional techniques in which management of this information is provided at the service provider system. Additionally, these techniques support increased communication efficiency and reduced power consumption by enabling data sharing directly between the entity and the service provider systems based on access controls defined by individual entities. In other words, data transmission to and from the "middleman" service provider system can be eliminated, along with redundant storage of an entity's data thereby improving operational efficiency and reducing power consumption of devices that implement these techniques. Further, the amount of data communicated via the networks is also reduced, thereby improving efficiency as the access controls are configurable to restrict what data is communicated on a "need to know" basis as defined by the entity, and therefore avoids communication of extraneous information.

A decentralized identity, for instance, is executed to implement logic defined using rules to control access to the decentralized identity data to "answer once, use many times." As such, the decentralized identity data is readily available without causing the entity to repeatedly engage in a same conversation. Consider a scenario in which the entity is booking a reservation at a restaurant. These techniques support an ability to provide a link to user preferences maintained at the decentralized identity without reentering this data, e.g., food allergies, food preferences, wine preferences, music preferences, and so on.

The decentralized identity is usable to supply a nearly endless amount of information to an equally nearly endless number of third-party service provider systems. As such, the nearly endless amount of information also results in another technical challenge to control "what is shared with whom." Accordingly, the decentralized node as previously described is also configurable to implement APIs and access protocols using rules to control access through execution of the decentralized identity. Machine learning and artificial intelligence are also usable to resolve ambiguities as part of access control, such as to control release of information based on user preferences, provide options to a user to control access requests to the information, and so on. Thus, in this example the entity is provided with an ability to control sharing of the decentralized identity data via the decentralized identity directly with a particular service provider system.

The decentralized identity is also configurable to support access control techniques usable to control sharing of the decentralized identity data maintained by the decentralized identity between third-party service provider systems. The decentralized identity, for instance, "lives" in an identity wallet and decentralized nodes. In one example, the identity wallet is configurable as part of a digital wallet having cryptographic keys for use as part of a blockchain. The decentralized identity is accessible by the third-party service provider systems in this example, access to which is also shareable directly between the third-party service provider systems based on access controls established by the entity.

An applet, for instance, is executed by the identity wallet and linked to the decentralized identity, which grants certain permissions via respective APIs. The decentralized identity defines an identity space using decentralized identity data and shares access to the space while providing visibility into what is being shared through use of respective APIs that are accessible via respective decentralized identifiers.

The use of the decentralized identifiers is also usable to persist use of the decentralized identity by individual third-party service provider systems. The decentralized identifiers, for instance, are leveraged as "cookies" and as such support use as part of legacy identity maintenance techniques used by the systems, e.g., the "cookie" is the decentralized identifier associated with a respective API of the decentralized identity. Rules defined as part of the decentralized identity, for instance, support an ability of the entity to control sharing of access via respective APIs between third-party service provider systems. Sharing of access and control of the access is usable to support a variety of scenarios.

Consider a travel scenario in which the entity books a flight with a respective airline, data describing which is maintained via a respective travel API of the decentralized identity, e.g., at a personal datastore. An option is selectable by the entity to "opt in" to sharing of this information such that a rental car company is given access to the travel API by the airline. Accordingly, the rental car company is notified via permissions in this example regarding delays by the airline that affect the particular entity associated with the decentralized identity.

In another example, the decentralized identity has "opted in" to geolocation sharing with third-party service provider systems. The third-party service provider systems, for instance, transmit a query signal using a respective server, e.g., as a "beacon." Receipt of the signal by an edge device associated with the entity is then usable to provide a decentralized identifier to access a respective API of the decentralized identity. Other examples are also contemplated, including use of global positioning functionality to communicate decentralized identifiers based on third-party service provider systems that are located using a map API.

In a further example, the decentralized identity has "opted in" to sharing across third-party service provider systems. Sharing is usable in this example to foster formation of a community to support transfer of information between the entities. Sharing of the decentralized identity data by the decentralized identity is usable, for instance, to specify preferences that if not currently able to be met by a first service provider system are communicated for use by another service provider system, e.g., to locate particular goods or services. A variety of other examples are also contemplated that overcome conventional technical challenges in support of access controls for a decentralized network, further discussion of which is included in the following sections and shown in corresponding figures.

FIG. 1 is a non-limiting illustration of an example system 100 that is operable to implement access control techniques for a decentralized network as described herein according to an implementation of the present subject matter. The illustrated system 100 includes a decentralized platform 102 implemented using a plurality of nodes (e.g., web nodes), an example of which is illustrated as node 104. The node 104 is representative of a computer or other device tasked with validating transactions and maintaining a copy of shared data as further described below. Nodes 104 are individual computing devices that participate in the decentralized platform 102 by sharing resources and maintaining a copy of the shared data, such as a blockchain or distributed ledger. Each node functions independently, and there is no central authority governing the network. The overall functioning of a decentralized network is achieved through the collective efforts of these nodes, which follow a set of agreed-upon rules or protocols.

The system 100 also includes a first edge device 106 as representative of functionality available at an "edge" of the system 100 to a first entity 108, e.g., via respective computing devices. The node 104 of the decentralized platform and the first edge device 106 are communicatively coupled, one to another, via a network 110. The first edge device 106, for instance, includes a first communication system 112 that includes hardware and software functionality to support network communication, e.g., as a browser, a network-enabled application, an applet, and so forth.

Computing devices that implement the system 100 (e.g., the first edge device 106) are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as part of a service provider system.

In accordance with the described techniques, the system 100 implements a decentralized platform 102 through use of decentralized identifiers 114 and verifiable credentials 116 that are illustrated as maintained in a local storage device 118 of the first edge device 106. The decentralized identifiers 114 are configured as a self-owned identifier that supports decentralized authentication and routing. A self-owned identifier is a unique identifier that is owned and controlled by an individual entity, also referred to as a "self-sovereign identity," as contrasted with an entity controlled by a centralized authority (e.g., service provider system) that is vulnerable to attacks, hacks, and data breaches. The verifiable credentials 116 employ a data format for cryptographic presentation and verification of claims.

The node 104 includes a node manager module 120 having functionality in support of communication and message relay between the nodes 104 of the decentralized platform 102 as well as with the first edge device 106 via the network 110. Examples of functionality to do so include a data storage module 122 and a message relay module 124. The data storage module 122 is configured to collect and maintain decentralized identifier data 126, which is illustrated as maintained in a storage device 128. The decentralized identifier data 126 is formatted to support decentralized authentication and routing as performed by the message relay module 124, e.g., for communication between nodes and/or with the first edge device 106.

The decentralized identifiers 114 are configurable without use of subjective consensus as implemented using a conventional centralized service provider, but rather are self-generated and self-owned. Persistence of the decentralized identifiers 114 is maintainable by the first edge device 106 (e.g., via local storage device 118) of the first entity 108 and are interdiction resistant and as such are resistant to being interrupted or stopped by outside forces or authorities. Decentralized identifiers 114 are also universally indexed and discoverable as part of the decentralized identifier data 126 as further described in relation to FIGS. 3 and 4.

The node 104 of the decentralized platform 102, as representative of one of a plurality of decentralized nodes (e.g., decentralized web nodes), supports data storage and relays that allows entities, service provider systems, individuals, organizations and so forth to send, store, and receive encrypted or public messages and data. The node 104 is universally addressable and is "crawlable" using data addressing in relation to the decentralized identifiers. The node 104 is also configured to support decentralized replication of data across the nodes that is "eventually consistent" (e.g., the data is consistent across the nodes over time through continued data communication between the nodes) through communication of instances across individual nodes in the decentralized platform 102. The node 104 is configurable to support secure encryption through use of a cryptographic key associated with an individual's decentralized identifier 114 and support semantic discovery to discover different forms of published data based on a corresponding semantic type.

Figure 4:
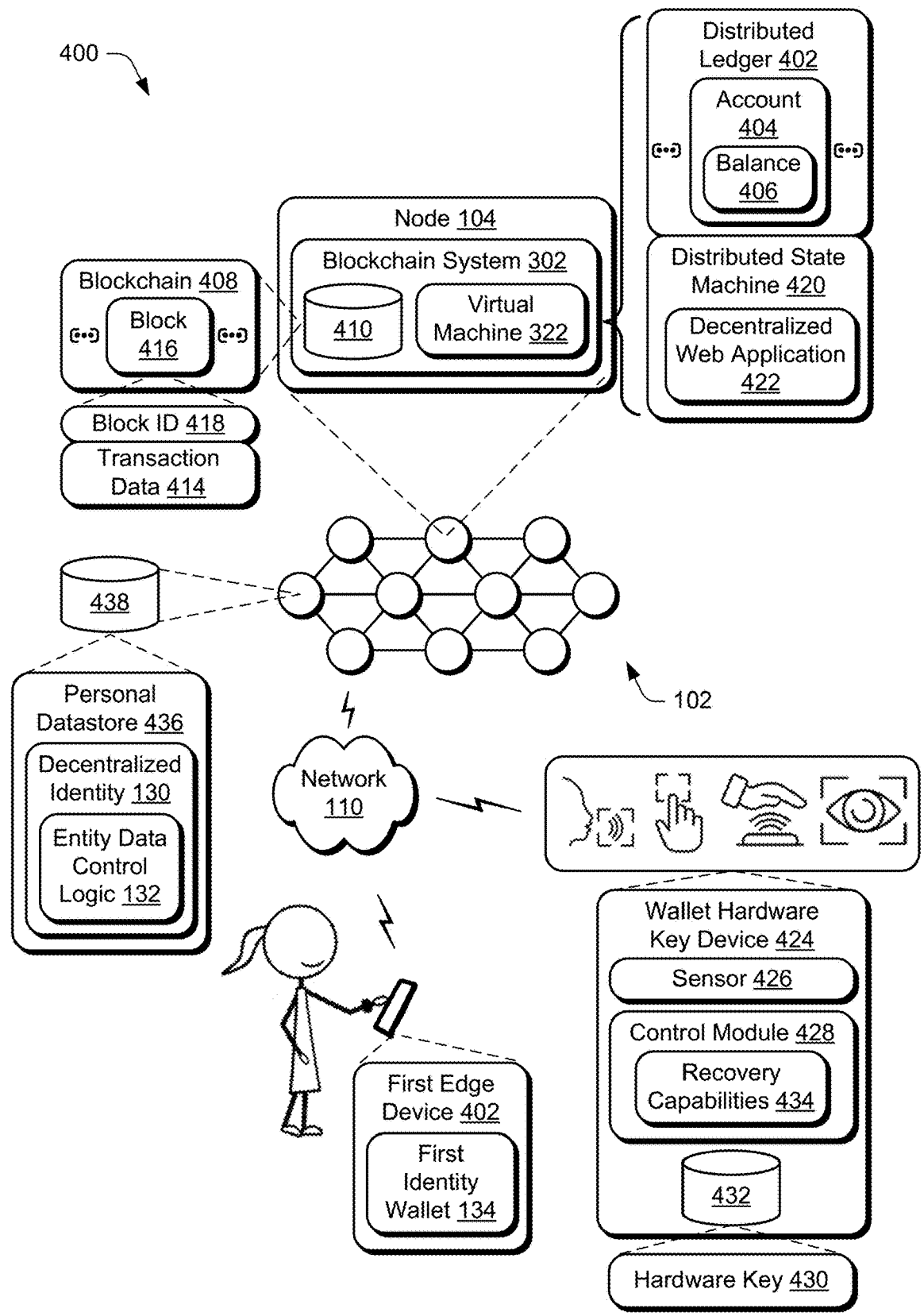
FIG. 4 is a non-limiting example showing operation of a node as part of a blockchain system of FIG. 3 according to an implementation of the present subject matter.

The node 104 is further configured to implement a decentralized identity 130 having entity data and control logic 132, e.g., through use as a personal datastore as described in relation to FIG. 4. The decentralized identity 130 is configured to support control by the first entity 108 of decentralized identity data made available via the decentralized identity 130 to respective third-party service provider systems. As such, the decentralized identity 130 gives the first entity 108 a degree of control of the access to the decentralized identity that is not possible in conventional techniques that are maintained at the service provider system, itself.

In order to generate the decentralized identity 130, a first identity wallet 134 is executed by a first edge device 106. The first identity wallet 134 is configured as part of a first digital wallet 136 in this example that is utilized to store cryptographic keys as further described in relation to FIG. 4. The first identity wallet 134 is configurable to implement a variety of functionality. In a first example, the first identity wallet 134 supports authentication and manages authorizations of decentralized identifiers 114. The first identity wallet 134 also supports decentralized identifier functions to support, create, update, and recover decentralized identifiers 114. The first identity wallet 134 is further configurable to support context management to maintain an environment in which decentralized identifiers 114 are usable within a given contact, application, or context as well as credential functions to sign, verify, discover, and present credentials to verifying parties.

The first identity wallet 134 also includes functionality to generate and output a user interface and corresponding features to manage credentials and other data stored in a node 104 as part of a decentralized platform 102. As part of this functionality, the first identity wallet 134 is configured to output a user interface to generate the decentralized identity 130 and entity data and control logic 132 as executed by the node 104. The user interface is configurable to specify decentralized identity data that is stored as part of the decentralized identity 130 as well as how the data is accessed, e.g., via respective APIs, as further described in relation to FIGS. 5-8.

Figure 2:
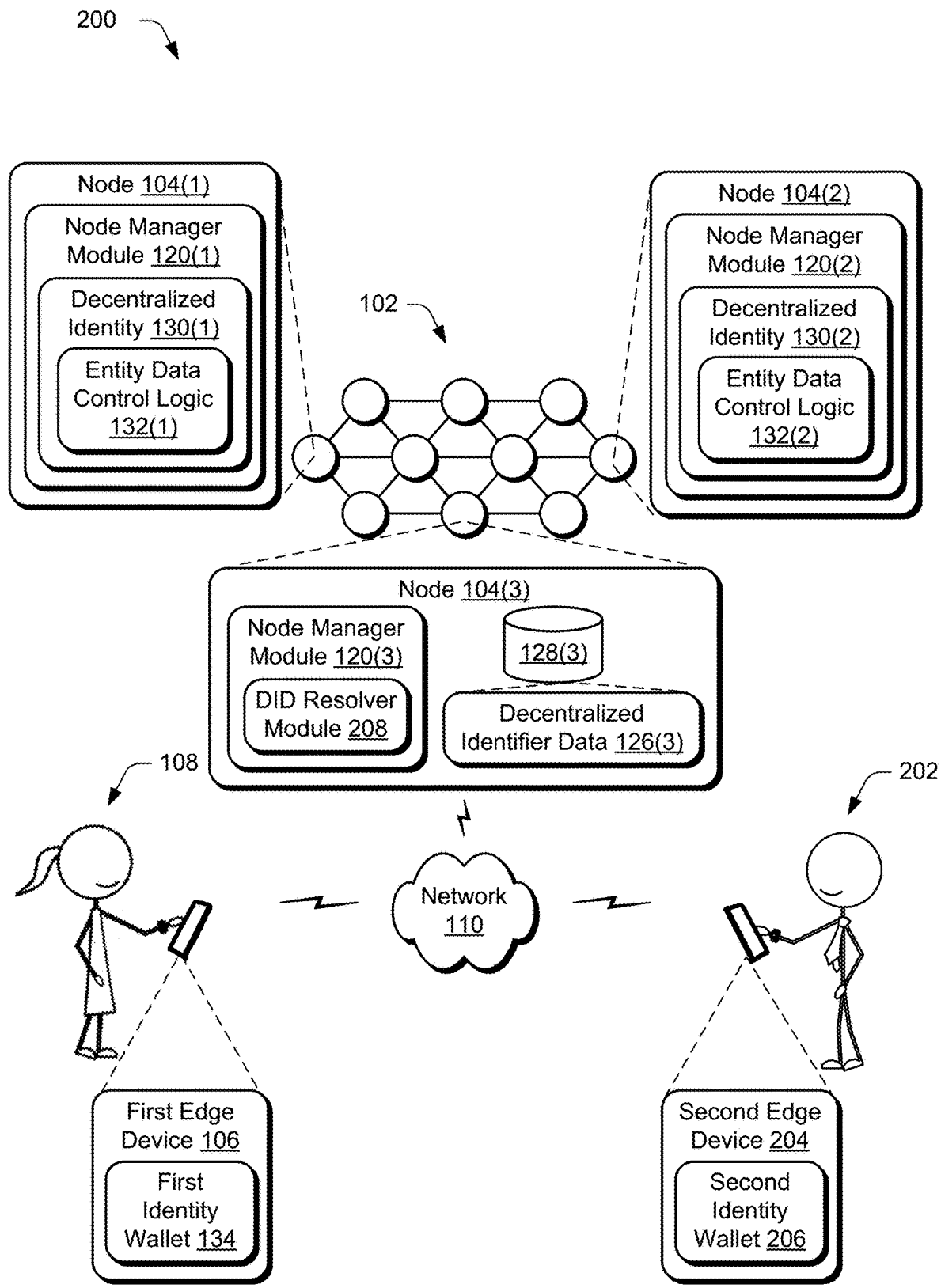
FIG. 2 is a non-limiting illustration of an example system depicting a topology of nodes as part of a decentralized network according to an implementation of the present subject matter.

FIG. 2 is a non-limiting illustration of an example system 200 depicting a topology of nodes as part of a decentralized network according to an implementation of the present subject matter. The system 200 includes a first entity 108 and associated first edge device 106 executing a first identity wallet 134 as described in FIG. 1. The system 200 also includes a second entity 202 and associated second edge device 204 and second identity wallet 206. The first edge device 106, the second edge device 204, and the decentralized platform 102 are communicatively coupled, one to another, via the network 110.

Examples of the node 104 of FIG. 1 include a node 104(1) having a node manager module 120(1) as executing a decentralized identity 130(1) and entity data control logic 132(1) as corresponding to the first identity wallet 134 of the first entity 108. Likewise, a node 104(2) is also included as executing a decentralized identity 130(2) and entity data control logic 132(2) as corresponding to the second identity wallet 206 of the second entity 202.

Node 104(3) includes a node manager module 120(3) and decentralized identifier data 126(3) as maintained in a respective storage device 128(3). The node manager module 120(3) includes a DID resolver module 208 that is configured to resolve requests to locate decentralized identifiers and corresponding nodes associated with the respective entities.

A decentralized identifier is generated by creating a unique public/private key pair. The public key is used to derive the decentralized identifier, while the private key is kept secret and used for cryptographic operations, such as signing and decrypting messages.

In one example, the first identity wallet 134 of the first entity 108 is used to message the second identity wallet 206 of the second entity 202. To do so, the first identity wallet 134 resolves a decentralized identifier associated with the second identity wallet 206 through communication with the DID resolver module 208 of node 104(3). A message is then sent based on the decentralized identifier from the first identity wallet 134 to the decentralized identity 130(2) of the second entity 202. In examples, the message is formatted according to a standard that can be read by the second identity wallet 206. Further, in some cases, the message may be encrypted such that the second identity wallet 206 receives the message securely and is capable of decrypting the message. The message, for instance, is configurable as part of a universal standard to employ semantic constructs as part of a schema implementing a naming convention of the datatypes of objects included in the message. Configuration of the message using the semantic constructs enables entities that receive the semantic message to readily parse the message using the schema to locate desired data. The decentralized identity 130(2) then communicates the message to the second identity wallet 206.

In reply, the second edge device 204 also resolves a decentralized identifier through communication with the DID resolver module 208 of node 104(3) using the decentralized identifier data 126(3). The decentralized identifier is then used by the second identity wallet 206 to send a message as a reply to the decentralized identity 130(1) of the first entity 108, which is then communicated back to the first identity wallet 134 as executed by the first edge device 106. In this way, a combination of decentralized identifiers and decentralized nodes supports a web of decentralized-identifier-secured messaging, data sharing, and credential exchange as a replacement for one-off protocols with a universal standard for semantic data exchange that supports encryption. As a result, the decentralized platform 102 supports execution of decentralized applications that use decentralized identifiers and decentralized nodes to return ownership and control over identity and corresponding data to respective entities.

Figure 3:
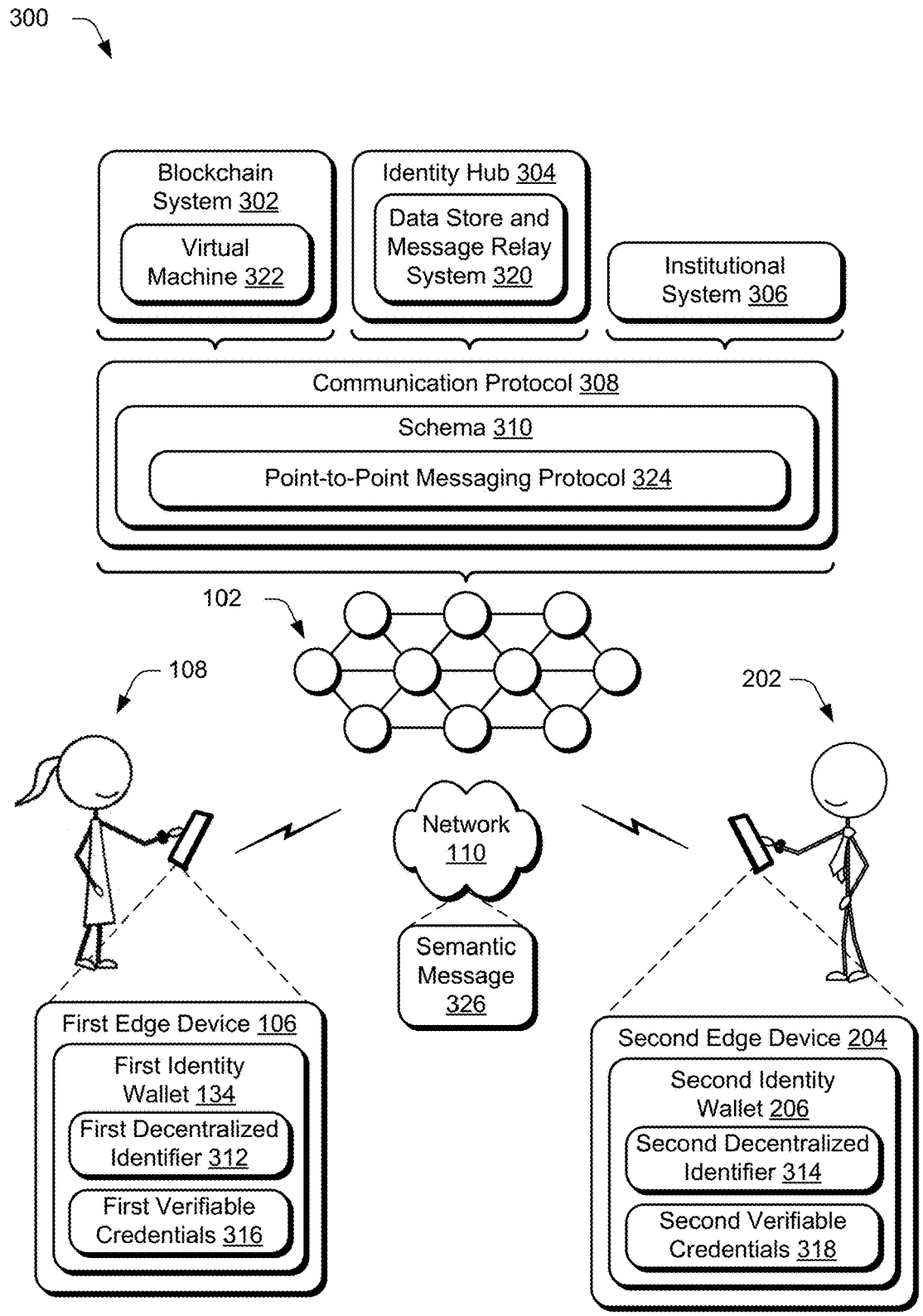
FIG. 3 is a non-limiting illustration of an example system that is operable to implement decentralized network supported resource transfer communication protocol techniques described herein according to an implementation of the present subject matter.

FIG. 3 is a non-limiting illustration of an example system 300 that is operable to implement decentralized platform supported communication protocol techniques described herein according to an implementation of the present subject matter. The illustrated system 100 includes the first edge device 106, the second edge device 204, a second entity 202 and associated second edge device 204, a blockchain system 302, an identity hub 304, and an institutional system 306 (as an example of a third-party service provider system) that are communicatively coupled, one to another, via the network 110. The institutional system 306 is configurable in a variety of ways as representative of third-party functionality incorporated as part of the example system 300. In one example, the institutional system 306 incorporates functionality supportive of exchange of cryptographic and fiat currencies between the entities.

In accordance with the described techniques, the system 300 implements a communication protocol 308 configured to provide decentralized platform support for resource transfer in this example. The communication protocol 308 incorporates various components, including decentralized identifiers and credentials as previously described as well as a schema 310. Examples of the decentralized identifiers include first and second decentralized identifiers 312, 314 as implemented by the first and second identity wallets 134, 206, respectively. Additionally, examples of the credentials include first and second verifiable credentials 316, 318 as implemented by the first and second digital wallets 134, 206, respectively.

The schema 310 is employed as part of decentralized networks to define the format in which the data can be shared across the identity hub 304, the first and second identity wallets 134, 206, and institutional systems 306. In one implementation, the identity hub 304 changes the schema 310 based on the context of the request and other data, such as for personally identifiable information and distributed identifiers. The communication protocol 308 does so in an example by providing a framework for establishing social trust using a decentralized identity and verifiable credentials to establish provenance (e.g., chronology of ownership) of an identity, e.g., the first and second entities 108, 202 of the first and second edge devices 106, 204, identity of the institutional system 306, and so forth. The communication protocol 308 is configurable as being operably agnostic with respect to anonymity, thereby supporting participation by respective entities as desired by the entities to negotiate and establish an amount of information that is acceptable to the entities that are part of the resource transfer.

The communication protocol 308 addresses conventional challenges involved in exchange of resources through use of decentralized platform supported identity management. In an implementation, the communication protocol 308 supports an infrastructure involving communication between the first and second edge devices 106, 204, institutional system 306, and blockchain system 302 without use of centralized intermediaries and trust broker systems. The infrastructure improves access, reduces operational latency, and improves device operation that implements these techniques. In the illustrated example, the communication protocol 308 provides a framework for identity messaging and maintenance and leverages the blockchain system 302 as implementing cryptocurrencies and other cryptographic assets.

The communication protocol 308 facilitates the formation of mutual trust between parties involved in a message transfer that is not centrally controlled. Mutual trust is implemented, for instance, through direct trust negotiation between the parties, use of mutually trusted third-party systems to "vouch" for the parties, and so forth. The communication protocol 308 is configurable in an example to implement trust between interacting entities in a manner that differs from conventional decentralized exchange protocols in that the system is not trustless and as such supports an ability to establish trust between the entities to a desired degree. Establishment of trust, for instance, includes verification that an entity "is who they say they are," is not a malicious party, and so forth. The communication protocol 308 is configurable to employ decentralized trust through a public key infrastructure (PKI) that is usable to secure communication between entities, e.g., the first and second edge devices 106, 204, the institutional system 306, and so forth. The communication protocol 308 is built upon the decentralized identifiers used by the first and second edges devices 106, 204 as well as other entities in the system 300, e.g., the institutional system 306. Decentralized identifiers in this example support verifiable, decentralized digital identity.

As such, decentralized identifiers are configurable to refer to a variety of different entity types (e.g., a user, organization, institution, data model, thing, abstract entity, and so forth) as determined by a controlling entity of the decentralized identifier. This is in contrast to typical federated identifiers, in that decentralized identifiers are decoupled from centralized registries, identity providers, and certificate authorities. For example, while other parties may be used to enable information discovery related to a decentralized identifier, this configuration supports an entity which is associated with a decentralized identifier control over the identity associated with entity without involving permission from another entity.

Decentralized identifiers (DIDs) are configurable as uniform resource identifiers (URIs) that associate a DID subject with a DID document, thereby supporting trustworthy interactions associated with that subject. Examples of the decentralized identifiers include a first decentralized identifier 312 associated with the first identity wallet 134 and a second decentralized identifier 314 associated with the second identity wallet 206. Decentralized identifier (DID) documents, which are linked to the decentralized identifiers, are configurable as a metadata file that includes a variety of data elements, examples of which include cryptographic material and routing endpoints. Cryptographic material is usable by an entity that is associated with the decentralized identifier to provide control, e.g., through use of public keys, digital signatures, and so forth. Routing endpoints specify locations, at which, data with an entity that is associated with the decentralized identifier is exchanged and/or at which the entity is contacted. The routing endpoints, for instance, specify an identity hub 304 having associated personal data storage and relay nodes used by a data store and message relay system 320.

Decentralized identifier techniques are implemented by the communication protocol 308 in a variety of ways. Examples include use of a communication protocol 308 that is open, public, and permissionless, and is tamper resistant. Further, the communication protocol 308 produces a record that is probabilistically finalized (i.e., the record is permanent and cannot be altered or reversed as subsequent blocks are added as part of the blockchain) and independently, deterministically verifiable, even in the presence of segmentation, state withholding, and collusive node conditions. Further, the communication protocol 308 is not reliant on authorities, trusted third parties, or entities that cannot be displaced through competitive market processes.

Credentials are also used as part of the communication protocol 308, examples of which include the first and second verifiable credentials 316, 318 stored, respectively, as part of the first and second identity wallets 134, 206. These credentials are configured as cryptographically secure, respect privacy, and are machine verifiable. In one implementation, inclusion of a zero-knowledge proof is usable to further advance privacy and safety by preventing an ability to link across disclosures, reduces an amount of data that is discoverable, and reduces raw data value exposure.

The system 300 is also configurable to include a variety of additional entities that are involved as part of the communication protocol 308, examples of which are illustrated as a blockchain system 302 implementing a virtual machine 322 and an identity hub 304 implementing the data store and message relay system 320.

The identity hub 304 provides an interface, through which, to store, discover, and fetch data related to communications involved in a request, e.g., identity access, supported by the communication protocol 308. The data store and message relay system 320 of the identity hub 304, for instance, are usable to locate public or permissioned private data related to a particular decentralized identifier, e.g., the first and second decentralized identifiers 312, 314. The identity hub 304 is configurable as having a mesh-like datastore construction that supports an ability of an entity to operate multiple instances that synchronize to a same state across one another. Use of the mesh-like datastore construction provides an entity that is associated with the decentralized identity with an ability to secure, manage, and transact data with other entities without reliance on location or provider-specific infrastructure, interfaces, or routing mechanisms.

The identity hub 304 supports use of a semantic message 326 and respective data interfaces (e.g., as inferential application programming interfaces (APIs)) in accordance with the schema 310 that are accessible without direct knowledge of a semantic type of data that is to be exchanged. A diverse set of interactions and flows are modeled within these interfaces as part of the schema 310 by externally codifying sets of message schemas and processing directives to form respective protocols.

The semantic message 326 employs the schema 310 as supporting a naming convention of the datatypes of objects included in the message. Configuration of the semantic message 326 enables entities that receive the semantic message 326 to readily parse the message using the schema 310, e.g., to determine whether the semantic message 326 is of interest to the entity and process it accordingly. As such, the schema 310 of the semantic message 326 helps support the distributed architecture of the communication protocol 308. For example, the identity hub 304 is configured to identify, through semantics of the message, and process/forward the semantic message 326 to a respective institutional system 306 which can then also process the semantic message 326 based on the schema. In one example, the semantic messages 326 are signed by each entity through the process by the schema 310 as part of a point-to-point messaging protocol 324 as further described below.

Identity wallets (e.g., the first and second identity wallets 134, 206 as well as digital wallets for the institutional system 306) act as agents for individuals or institutions by facilitating exchanges with the institutional system 306 or other third-party service provider system. As such, identity wallets (as included as part of digital wallets as shown in FIG. 1) are configurable to support a variety of functionalities. Digital wallets, for instance, support secure encrypted storage for verifiable credentials as illustrated, e.g., the first and second verifiable credentials 316, 318. Digital wallets also support discovery of an institutional system 306 or other third-party service provider system by crawling the identity hub 304. Digital wallets include mechanisms for receiving, offering, and presenting verifiable credentials used as part of the communication protocol 308. Further, digital wallets implement digital signature mechanisms and support an ability to store a transaction history. Digital wallets are configurable to support seamless transfer of credentials between the digital wallets, and as such does not claim "ownership" of verifiable credentials. Additionally, operation of the digital wallets is consent driven by an entity associated with the digital wallet.

As a result, functionality of the digital wallets and identity wallets as incorporated as part of the digital wallets operates to significantly simplify a user experience to perform message and identity access. In an implementation, the communication protocol 308 does not enforce specific criteria upon digital wallet implementations. Rather, digital wallet developers are supported with functionality to design features and functionality to achieve a desired user experience. For example, a digital wallet is configurable to select the institutional system 306 (e.g., algorithmically based on speed, cost, or track record and/or through use of machine learning) or delegate that choice to the entity associated with the digital wallet. In another example, a digital wallet developer preselects third-party service provider systems, chooses to request and verify the credentials of various systems ahead of time by conducting discovery and evaluation, and so forth. A digital wallet is also configurable to support selection of individual third-party service provider systems to the entity associated with the digital wallet, e.g., via user inputs.

The communication protocol 308 includes a plurality of communication layers, an example of which includes a point-to-point messaging protocol 324. The point-to-point messaging protocol 324 is used to implement secure communication between a digital wallet and the institutional system 306, e.g., to exchange data used to obtain and receive decentralized identity data.

The semantic messages 326 exchanged between the digital wallets and institutional system 306 (e.g., using the data store and message relay system 320 of the identity hub 304) contains semantically defined objects adherent to the schema 310. The message objects also contain data usable by the entities to evaluate requests, verify credentials, and execute value exchanges. The semantic message 326 is configurable as a JavaScript Object Notation (JSON) object, which is signed by each entity from a sending entity to the receiving entity for each segment of the resource transfer. The semantic message 326 is encrypted in one example and employs programming hooks that enable a message handler service to receive the semantic message 326 in real time at the identity hub 304 and process the messages as part of a data store and message relay system 320 in accordance with the semantics and rule set by the communication protocol 308 and schema 310 that are defined for a given message type. In this way, the identity data exchange is secured.

FIG. 4 is a non-limiting example 400 showing operation of a node 104 as part of a blockchain system 302 of FIG. 3 according to an implementation of the present subject matter. The blockchain system 302 implements a virtual machine 322 that is representative of a diverse range of functionality made possible by leveraging a blockchain 408. In a first such example, the virtual machine 322 implements a distributed ledger 402 of accounts 404 and associated balances 406 of those accounts 404. Distributed ledgers 402 support secure transfer of digital assets (e.g., tokens or units of cryptocurrencies) between accounts 404. The secure transfer is performable without management by a central authority through storage (illustrated using a storage device 410) by nodes 104 of the blockchain system 302 as part of transaction data 412. The transaction data 412 is maintained as part of blocks 416 (and associated block IDs 418) of the blockchain 408.

Through synchronized and distributed access supported by the blockchain 408, changes to balances 406 (e.g., a number of tokens) are visible to any entity with access to the blockchain 408. Techniques are also implemented to support management of the balances 406 across the accounts 404, e.g., to enforce rules that a respective account 404 does not transfer more tokens than are available based on a balance 406 specified for that account 404.

In another example, the virtual machine 322 implements a distributed state machine 420 that supports execution of a decentralized web application 422. The distributed state machine 420 is implemented along with the transaction data 412 within the blocks 416 of the blockchain 408 such that the blocks 416 describe accounts and balances as described above for the distributed ledger 402. The transaction data 412 also supports a machine state, which can change from block to block of the blockchain 408. In one example, the decentralized web application 422 is executable as part of a "Turing-complete" decentralized virtual machine that is distributed across the nodes 104 of the blockchain system 302. As Turning-complete, the decentralized web application 422 is computationally universal to perform computing device operations, e.g., logic or computing functions. Thus, the decentralized web application 422 is executable by a processing system as software that is storable in a computer-readable storage medium of the nodes 104 to perform a variety of operations.

An example of the decentralized web application 422 is executable automatically and without user intervention (or with partial human interaction wherein desired) by the nodes 104 of the distributed state machine 420. Execution of the decentralized web application 422 includes obtaining data from a specified data source (e.g., devices, APIs, and so forth that are accessible via the network 110), and based on the data, initiating one or more operations based on conditions described in the decentralized web application 422.

A wallet hardware key device 424 is implemented to add additional layers of security. The wallet hardware key device 424, for instance, includes a sensor 426 that is configured to receive inputs that are usable to uniquely identify the first entity 108, e.g., via spoken utterance, a pin, a fingerprint scanner, palm reading, eye reading, and so forth. Inputs received via the sensor 426 are used by a control module 428 to permit or restrict access to the hardware key 430 maintained in the storage device 432. The control module 428 also includes recovery capabilities 434, e.g., in case the first entity 108 loses the first edge device 106 and therefore access to the first identity wallet 134. The wallet hardware key device 424, for instance, is usable to prove ownership of corresponding hardware, e.g., the first edge device 196. A fingerprint sensor, for example, of the wallet hardware key device 424 is usable to authenticate the identity of the first entity 108 before the wallet hardware key device 424 interacts with a near-field-communication (NFC) field of the first edge device 106 in order to sign a transaction using the first identity wallet 134, e.g., using a corresponding cryptographic key. In another example, a PIN is entered using the first identity wallet 134 and is then communicated using NFC to the wallet hardware key device 424 to unlock the device.

Both the first identity wallet 134 and the wallet hardware key device 424 are configurable to work together in physical proximity (e.g., via NFC) to move larger amounts of funds, e.g., an amount that is over a transaction limit In an implementation, the first identity wallet 134 outputs a user interface, via which, the first entity 108 enters a value to set the transaction limit, entry of which is verified using the wallet hardware key device 424. The transaction limit is then utilized to permit or restrict transactions based on an amount of the transaction. For a transaction over the transaction limit, for instance, the transaction is permitted if signed by both the first identity wallet 134 and the wallet hardware key device 424 using corresponding cryptographic keys. For an amount under the transaction limit, the transaction is permitted if signed by the first identity wallet 134, itself. In order to change the transaction limit in one example, both the first identity wallet 134 and the wallet hardware key device 424 are utilized.

A personal datastore 426 is utilized to maintain the decentralized identity 130 and entity data control logic 132. The personal datastore 436 is implemented "off chain" on a personal datastore device 438 on a node associated with the first entity 108 and is remotely hosted, e.g., by a digital service system. The personal datastore 436, for instance, is implemented as a node 104 as part of the decentralized platform 102. Anchoring events that tie a set of public keys and URLs to a given decentralized identifier are performed as part of the blockchain system 302.

Figure 5:
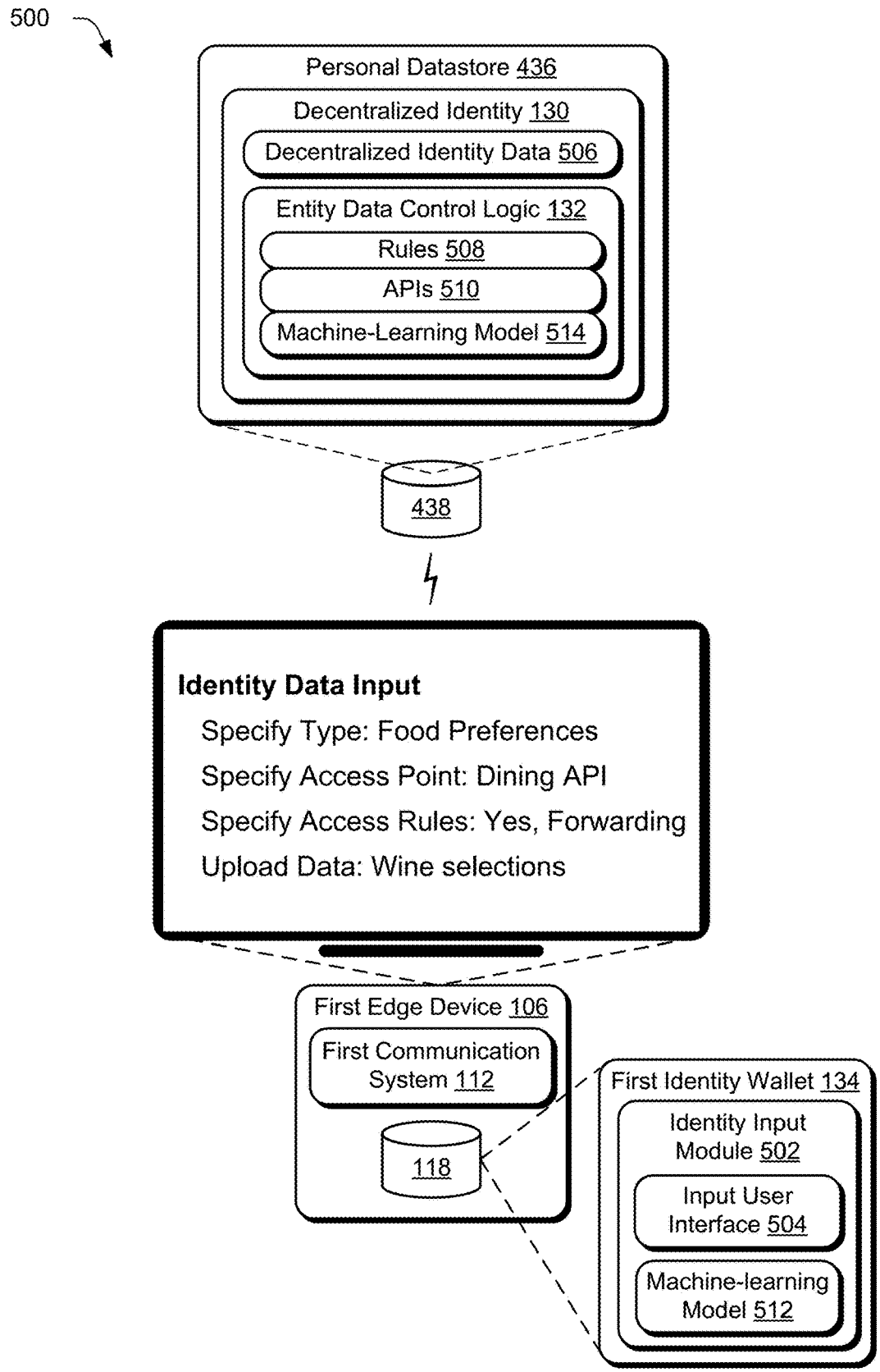
FIG. 5 is a non-limiting example showing operation of an identity wallet as supporting input of decentralized identity data according to an implementation of the present subject matter.

FIG. 5 is a non-limiting example 500 showing operation of an identity wallet as supporting input of decentralized identity data according to an implementation of the present subject matter. The first identity wallet 134 is executed by a first edge device 106 in communication with a personal datastore 436 of a personal datastore device 438. The personal datastore 436 is configurable as part of a node in the decentralized network 102. The first identity wallet 134 includes an identity input module 502 that is executable to output an input user interface 504. The input user interface 504 supports user interaction to input decentralized identity data 506 that is maintained as part of the decentralized identity 130.

The identity input module 502, for instance, outputs an input user interface 504 configured to specify a type of the data, an access point to be used to access the data (e.g., a particular application programming interface), access rules for access to the data via the API (e.g., to permit sharing and forwarding of the API), and the decentralized identity data 506 itself. In the illustrated example, this specified type is "food preferences," the specified access point is a "dining API," the access rules include "yes, forwarding" and the uploaded data involves "wine selections." The decentralized identity data 506 is then uploaded to the decentralized identity 130 with the rules 508 and APIs 510 implemented as part of the entity data and control logic 132.

In the illustrated example, artificial intelligence (AI), such as machine-learning functionality, is employed to assist in generation and implementation of the decentralized identity 130. A machine-learning model 512, for instance, is executed to assist data classification of the decentralized identity data 506 for use with particular rules 508 and APIs 510, automatically and without user intervention. In a scenario in which the identity input module 502 is executed "in the background" to monitor user interaction, the machine-learning model 512 is used to classify data gleaned from that interaction for use with particular rules 508 and APIs 510. In some cases, a generative AI model may be used to generate classes of data, into which, the decentralized identity data is classified, generate the rules 508 that control the use of the decentralized identity data, and the like. The machine-learning model 512, for instance, is configurable to monitor tastes of the first entity 108 involving musical selections, generate decentralized identity data 506 describing those tastes, and associate particular rules 508 and APIs 510 using generative AI model techniques to access that data, and upload the data for use as part of the decentralized identity 130, automatically and without user intervention.

In another example, a machine-learning model 514 is implemented as part of the entity data and control logic 132 of the decentralized identity 130. The machine-learning model 514 is configurable, for instance, to resolve ambiguities in requests to access the decentralized identity data 506, e.g., through natural language understanding. The machine-learning model 514 is also usable to control what decentralized identity data 506 is shared and how the decentralized identity data 506 is shared. The decentralized identity data 506, for instance, may include health information and opt to share portions of the data that pertain to sleep tracking yet restrict access to other portions that are not relevant to a particular third-party service provider system. In this instance, the machine-learning model 514 is usable to intelligently respond to particular requests made to access the decentralized identity data 506 by providing decentralized identity data 506 that is pertinent to the request and yet is not personally identifiable information or otherwise considered sensitive to the first entity 108. A variety of other examples are also contemplated.

Figure 6:
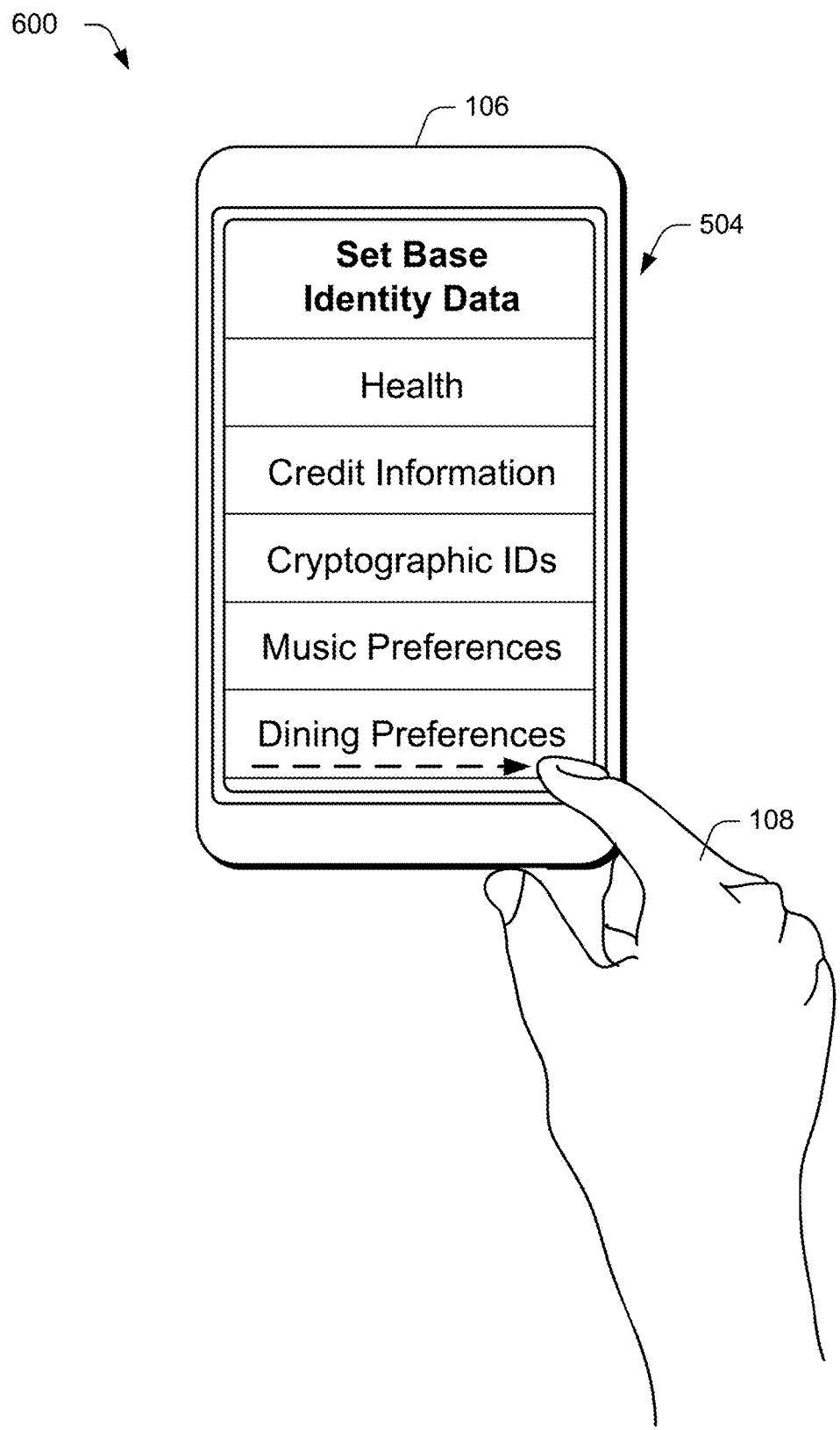
FIG. 6 is a non-limiting example showing operation of an identity wallet as supporting gamified input of decentralized identity data according to an implementation of the present subject matter.

FIG. 6 is a non-limiting example 600 showing operation of an identity wallet as supporting gamified input of decentralized identity data according to an implementation of the present subject matter. In this example, the input user interface 504 is displayed by the first edge device 106 and includes preconfigured portions of identity data that is usable for inclusion as part of the decentralized identity 130. The entity 108 is provided with an ability to select preconfigured portions and/or edit those portions, e.g., of dining preferences in the illustrated example.

The entity 108 can thus "swipe right" in this example to review and include particular information as part of the decentralized identity 130 and "swipe left" to remove corresponding data from consideration. The input user interface 504, for instance, is configurable as part of a generative AI to generate classifications based on user interactions with the user interface, applications that are available on the device, as well as data received from third party service provider systems. Use of the generative AI is therefore configurable to augment user input by generating new data that is similar in style or content in order to generate the classifications.

In another example, generative AI is usable to create and edit the input user interface 504 over time based on the user inputs, outside information, types of inputs supported, natural language instructions for interaction with the user interface, and so on. As a result, the input user interface 504 as "gamified" supports increased efficiency in collection of high-quality training data for machine learning models that implement formation of classifications and how the training data is collected. This gamification technique improves user efficiency in entry of the decentralized identity data 506 and encourages a greater range of data for inclusion as part of the decentralized identity data 506.

Figure 7:
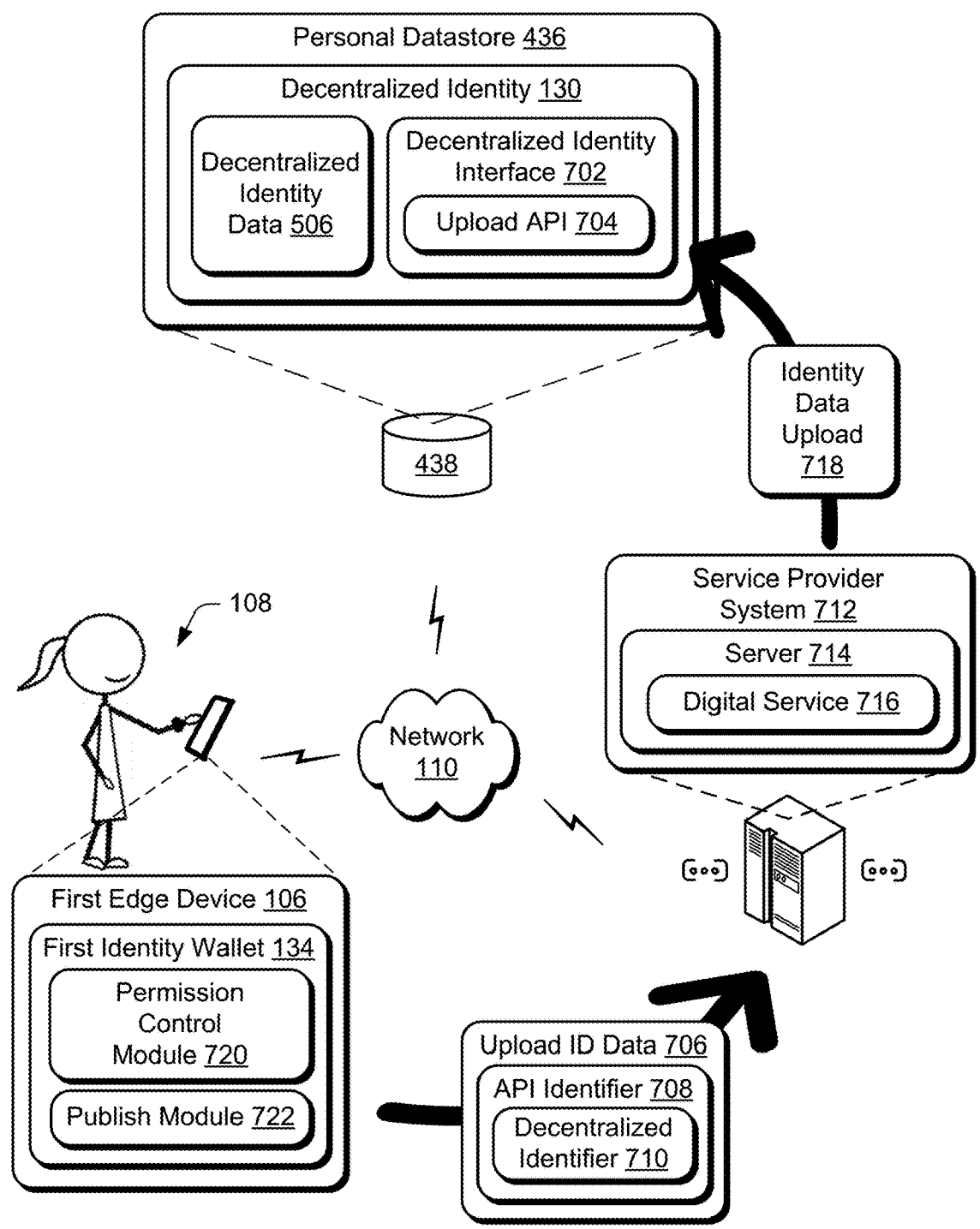
FIG. 7 is a non-limiting example showing operation of an identity wallet as supporting third-party input of decentralized identity data according to an implementation of the present subject matter.

FIG. 7 is a non-limiting example 700 showing operation of an identity wallet as supporting third-party input of decentralized identity data according to an implementation of the present subject matter. In the examples of FIGS. 5 and 6, the first entity 108 is tasked, through interaction with the first identity wallet 134, with upload of the decentralized identity data 506 as part of the decentralized identity 130. The first identity wallet 134 is also usable to provide access to third parties via a decentralized identity interface 702 of the decentralized identity 130 to upload decentralized identity data 506.

The decentralized identity interface 702, for instance, includes an upload API 704. The first identity wallet 134 is configured to share upload ID data 706 having an API identifier 708 (e.g., a decentralized identifier 710) associated with the upload API 704. In the illustrated example, a service provider system 712 includes a server 714 that executes a digital service 716 and generates an identity data upload 718 for communication via the upload API 704 to the decentralized identity 130. The digital service 716, for instance, is configurable as a music streaming service and the identity data upload 718 includes music selections of the first entity 108. In another instance, the identity data upload 718 includes credit and financial information from a financial digital service 716, e.g., for a point-to-point payment system. Alternatively or additionally, the identity data upload 718 includes inventory data, staffing data, appointments data, and/or other merchant-related data in cases where the digital service 716 is a merchant management service. The identity data upload 718 may include additional and/or other data types for corresponding types of services provided by the digital service 716.

The first identity wallet 134 then supports an ability to review the identity data upload 718 through use of a permission control module 720. Review of the identity data includes an ability to set access control rules, review the data for accuracy, and so forth. If acceptable, a publish module 722 is utilized to publish the identity data upload 718 as being available as part of the decentralized identity data 506 of the decentralized identity 130, e.g., via respective application programming interfaces.

Consider a scenario in which the server 714 of the service provider system 712 provides a digital service 716 involving music streaming. The identity data upload 718 identifies digital songs streamed to the first edge device 106 associated with the first entity 108. Through use of the permission control module 720, the first entity 108 sets entity data and control logic 132 to permit third-party service provider system access to the data without first reviewing the data by the first entity 108.

On the other hand, the server 714 of the service provider system 712 provides a digital service 716 involving monetary transactions (e.g., a point-to-point payment system) and the identity data upload 718 identifies a subject and amounts of those transactions. Accordingly, the permission control module 720 sets permissions that specify this data is to be reviewed first before being made available as part of the decentralized identity data 506. Further, entity data and control logic 132 is set to limit availability of this data via a particular API to particular third-party service provider systems, e.g., an accounting system associated with an accountant used by the first entity 108. In this way, the first entity 108 through use of the first identity wallet 134 is given control over what data is included as part of the decentralized identity data 506 and how that data is shared by the decentralized identity 130, further discussion of which is included in the following description.

Figure 8:
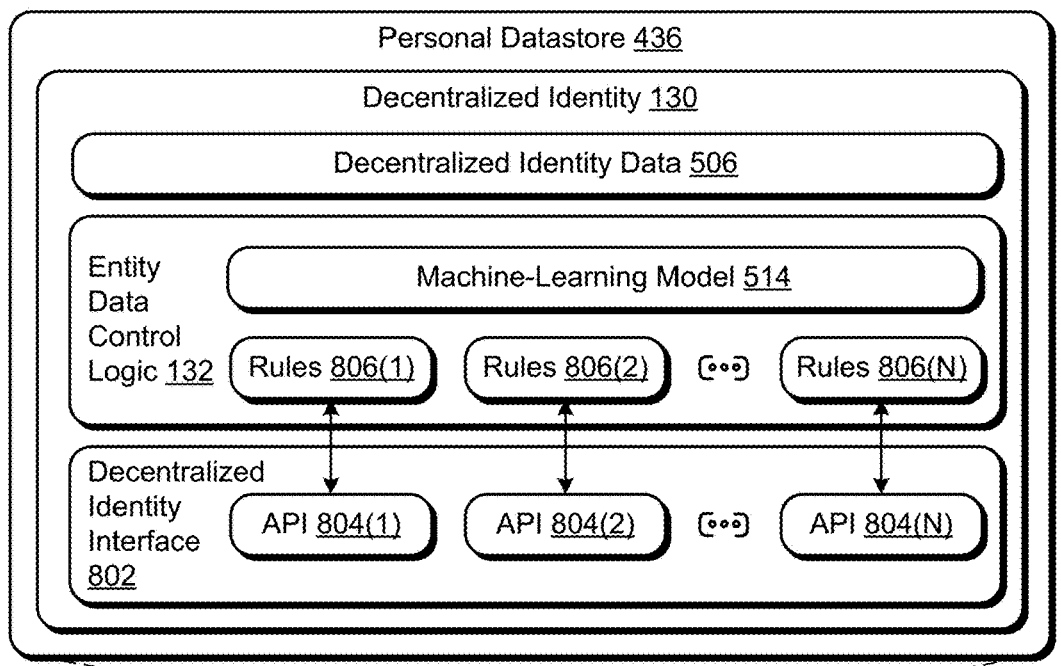
FIG. 8 is a non-limiting example showing operation of a decentralized identity using respective application programming interfaces and rules to control access to decentralized identity data according to an implementation of the present subject matter.
Figure 8:
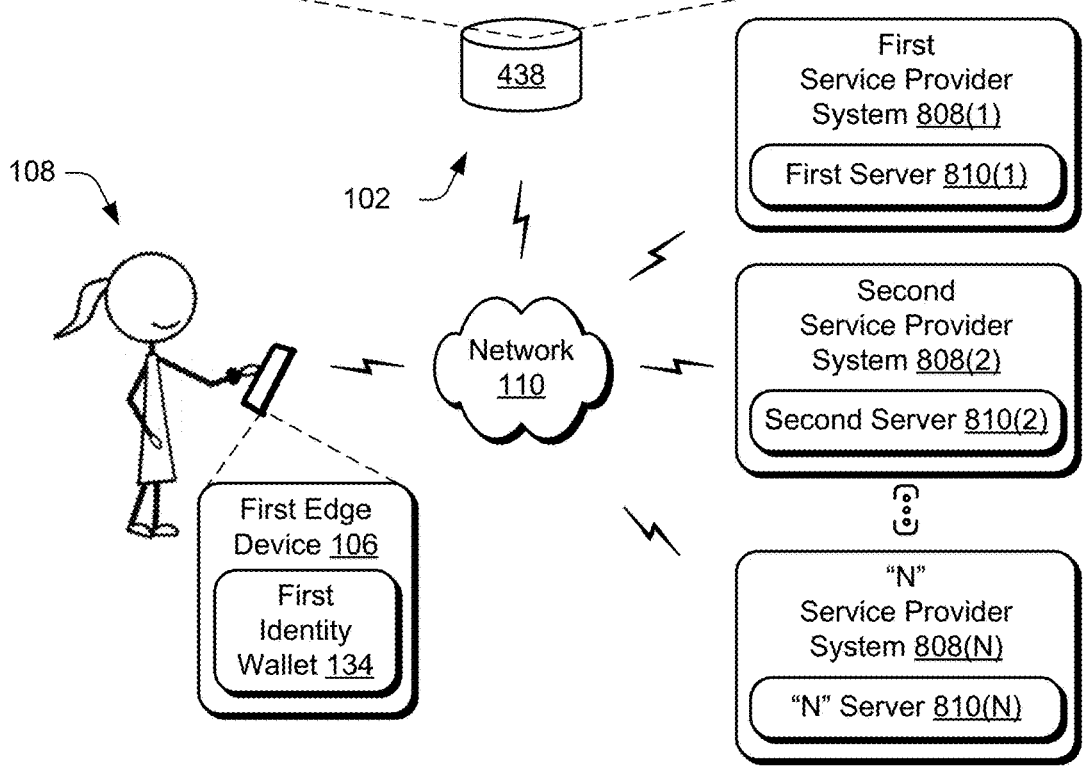

FIG. 8 is a non-limiting example 800 showing operation of a decentralized identity using respective application programming interfaces and rules to control access to decentralized identity data according to an implementation of the present subject matter. The decentralized identity 130 in this example includes a plurality of application programming interfaces, examples of which are illustrated as API 804(1), API 804(2), . . . , API 804(N).

Each of these APIs has associated rules 806(1), 806(2), . . . , 806(N) implemented as part of the entity data and control logic 132 to control access to respective portions of the decentralized identity data 506. Through use of the different APIs 804(1)-804(N), access is provided to different portions of the decentralized identity data 506 to different service provider systems and associated servers, e.g., first, second, . . . , through "N" service provider systems 808(1), 808(2), . . . , 808(N) and associated first, second, . . . , through "N" servers 810(1), 810(2), . . . , 810(N).

The APIs 804(1)-804(N) are configurable in a variety of ways, such as uniform resource locators (URLs), uniform resource identifiers (URIs), through use of decentralized identifiers, and so forth. As previously described, decentralized identifiers (DIDs) are configurable as uniform resource identifiers (URIs) that associate a DID subject with a DID document, thereby supporting trustworthy interactions associated with that subject. Decentralized identifier (DID) documents, which are linked to the decentralized identifiers, are configurable as a metadata file that includes a variety of data elements, examples of which include cryptographic material and routing endpoints. Cryptographic material is usable by an entity that is associated with the decentralized identifier to provide control, e.g., through use of public keys, digital signatures, and so forth. Routing endpoints specify locations, at which, data with an entity that is associated with the decentralized identifier is exchanged and/or at which the entity is contacted, e.g., through use of the identity hub 304 of FIG. 3 and/or the decentralized identifier data 126 of FIG. 1. Through use of the decentralized identifiers, access may be made available to a variety of service provider systems in a variety of scenarios, further discussion of which is included in the following description.

Figure 9:
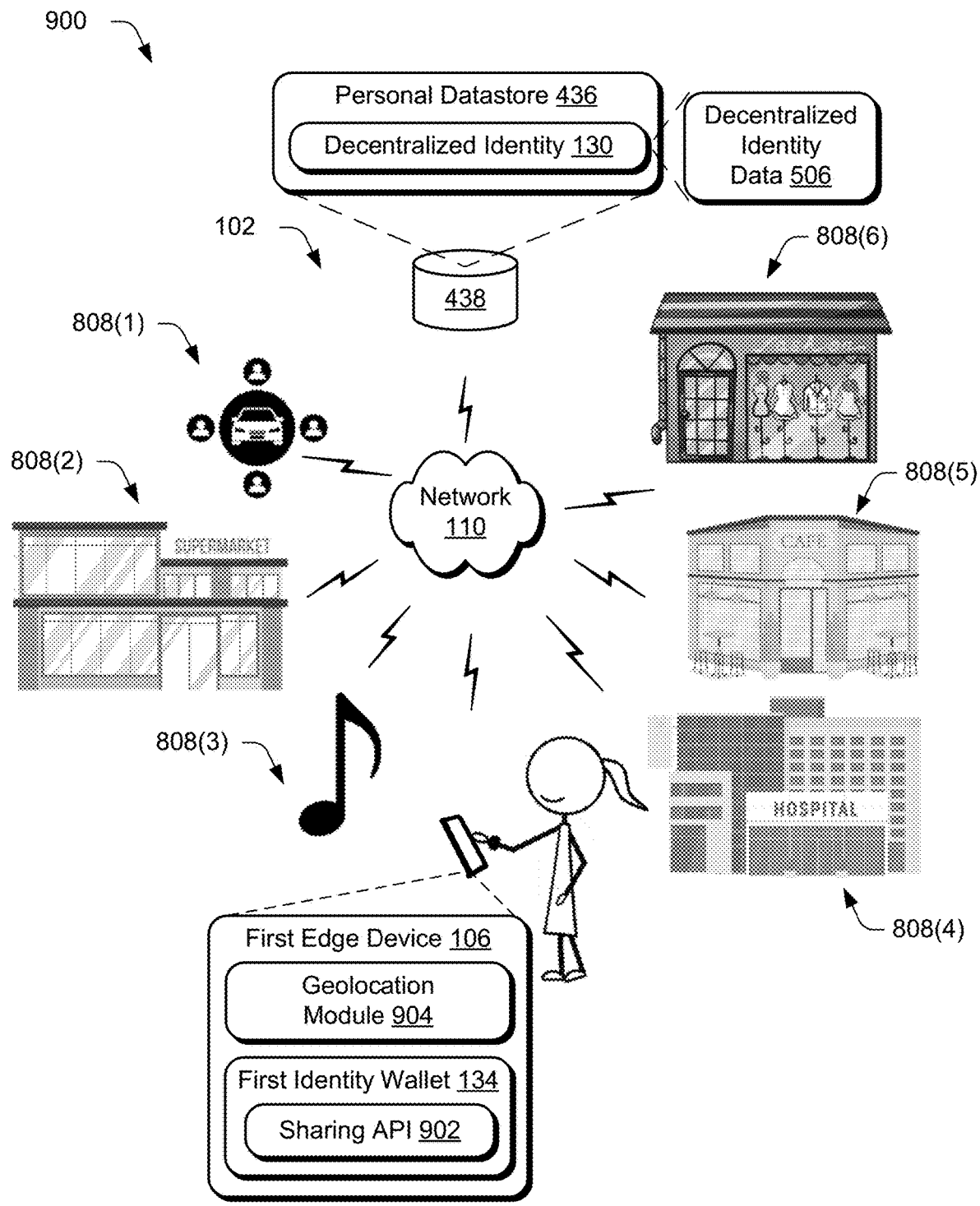
FIG. 9 is a non-limiting example showing operation of a decentralized identity and identity wallet using a sharing application programming interface to control access to decentralized identity data according to an implementation of the present subject matter.

FIG. 9 is a non-limiting example 900 showing operation of a decentralized identity and identity wallet using a sharing application programming interface to control access to decentralized identity data according to an implementation of the present subject matter. The decentralized identity 130 is implemented at a personal datastore 436 in this example as a decentralized identifier linked resource. A first edge device 106 executes a first identity wallet 134 locally at the device.

The first identity wallet 134 also includes an applet implementing a sharing API 902 that is configured to share access to the decentralized identity data 506 through sharing of a decentralized identifier associated with a respective API of the decentralized identity 130 as shown in FIG. 8. The applet, for instance, is implemented as a small application or program that is designed for execution within another application, e.g., a plug-in module within a browser. The applet is configurable for secure execution within a sandboxed environment to limit access of the applet to resources outside the environment as well as limit access of the outside resources to the applet. The decentralized identifier is then utilized to access the decentralized identity 130. In an example in which the service provider system is associated with a car-sharing service 808(1), for instance, the sharing API 902 of the applet exposes decentralized identifiers associated with music preferences, conversation preferences, and/or transaction credentials. In another example in which the service provider system is associated with a supermarket 808(2), the sharing API 902 of the applet exposes a decentralized identifier associated with a shopping list.

Likewise, in an example in which the service provider system is associated with a music streaming service 808(3), the sharing API 902 of the applet exposes a decentralized identifier associated with music preferences, usage data, streaming device availability, a preference to listen to "new music," and so forth. In a further example in which the service provider system is associated with a hospital 808(4), the sharing API 902 of the applet exposes a decentralized identifier associated with insurance details, medical history, allergies, blood type, and emergency contacts.

In an example in which the service provider system is associated with a café 808(5), the sharing API 902 of the applet exposes a decentralized identifier associated with a beverage preference. In yet another example in which the service provider system is associated with a clothing retailer, the sharing API 902 of the applet exposes a decentralized identifier associated with clothing sizes, preferences (e.g., no animal products), and so forth. In an implementation, exposure of the decentralized identifiers is controlled using the machine-learning model 512 associated with the first identity wallet 134 as described in relation to FIG. 5 to resolve requests, "push" relevant decentralized identifiers, and so forth.

In a geolocation example, the first edge device 106 includes a geolocation module 904 that is usable to determine a geographic location of the first edge device 106, e.g., using global positioning system functionality, triangulation through use Wi-Fi access points and/or cellular towers, and so forth. The first identity wallet 134, for instance, "opts in" to geolocation sharing with one or multiple third-party service provider systems. The geolocation module 904 then determines a geographic location, and based on this location, performs a lookup (e.g., via a map application programming interface) to determine what third-party service provider systems are associated with the location, e.g., particular retailers, restaurants, and so forth. Based on the lookup, the first identity wallet 134 exposes a relevant decentralized identifier to the systems. In another example, the third-party service provider system is configured to support transmission of a query signal using a respective server, e.g., as a "beacon." Receipt of the signal by the first edge device 106 associated with the entity is then usable to provide a decentralized identifier to access a respective API of the decentralized identity.

In this way, the decentralized identifiers support access to a "big pie" of information that is portioned using the identifiers, e.g., as APIs for particular access rights. In a pho restaurant scenario, an order may be placed online using the first edge device with a link the first identity wallet 134. The pho restaurant, through the decentralized identity, is given access to user preferences with varying levels of granularity. For example, the first entity 108 may specify user preference to "always want to know what is most popular" and is served with that recommendation right away by the restaurant. To support this, the first entity 108 "opts in" into location sharing by the geolocation module 904 of blockchain supported data. The first entity 108 may also opt in to leveraging information from other entities to obtain corresponding recommendations, e.g., based on what was purchased at the pho restaurant by these other entities. Other examples are also contemplated.

Figure 10:
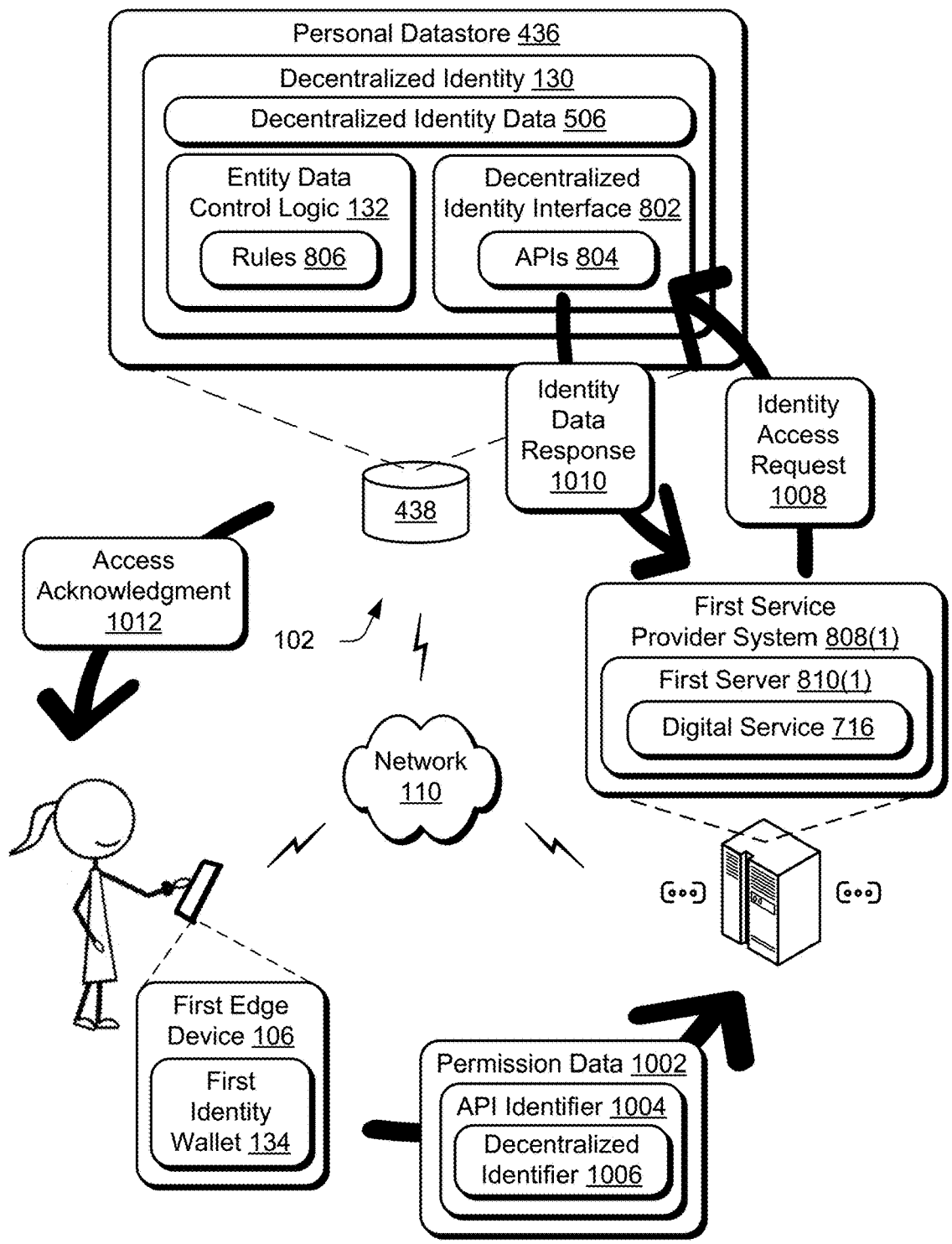
FIG. 10 is a non-limiting example showing operation of an identity wallet and decentralized identity to control access to decentralized identity data by a service provider system according to an implementation of the present subject matter.

FIG. 10 is a non-limiting example 1000 showing operation of an identity wallet and decentralized identity to control access to decentralized identity data by a service provider system according to an implementation of the present subject matter. In this example, the first identity wallet 134 is executed by the first edge device 106 to generate and communicate permission data 1002 to provide access to a respective API 804 of the 130. The permission data 1002 is configurable to include an API identifier 1004 that is usable to locate the API 804 as previously described, e.g., as a uniform resource locator, a decentralized identifier 1006 as illustrated, through use of a DID resolver module 208 as described in FIG. 2, and so forth.

The permission data 1002 is received by a first service provider system 808(1) in this example having a first server 810(1) that executes a digital service 716, e.g., any of the digital services as described in relation to FIG. 9, or other services not specifically recited in relation to FIG. 9. As part of executing the digital service 716, the first service provider system 808(1) generates and communicates an identity access request 1008 for communication via the APIs of the decentralized identity interface 802. In an example in which the digital service 716 is a music streaming service, the identity access request 1008 requests access to playlists, a history, user preferences, and so forth. In another example in which the digital service 716 is a point-to-point payment service, the identity access request 1008 is configurable to request user credentials, a balance, a transaction history, and so forth.

The permission data 1002 is configurable to implement a threaded messaging experience. In a threaded messaging experience, authorizations received from the first identity wallet 134 at the first edge device 106 have access to decentralized identifiers of institutional systems 306 (e.g., participating financial institutions) to authorize and enable financial transactions by sharing data in an amount that is sufficient to accomplish a specific transaction, and not more.

In response to the identity access request 1008, for instance, the entity data and control logic 132 employs rules 806 controlling whether to permit the request, e.g., to verify credentials of the first service provider system 808(1). If permitted, an identity data response 1010 is communicated back through the respective API 804 to the first service provider system 808(1). In the illustrated implementation, the decentralized identity 130 also communicates an access acknowledgment 1012 to the first identity wallet 134 to inform the first entity 108 of receipt of the identity access request 1008, generation of the identity data response 1010, and so forth. In this example, access to the decentralized identity 130 is given directly by the first entity 108 to the first service provider system 808(1) through the first identity wallet 134 to the decentralized identity 130. Other examples are also contemplated that involve sharing access between third-party service provider systems, a discussion of which is included in the following description and shown in a corresponding figure.

Figure 11A:
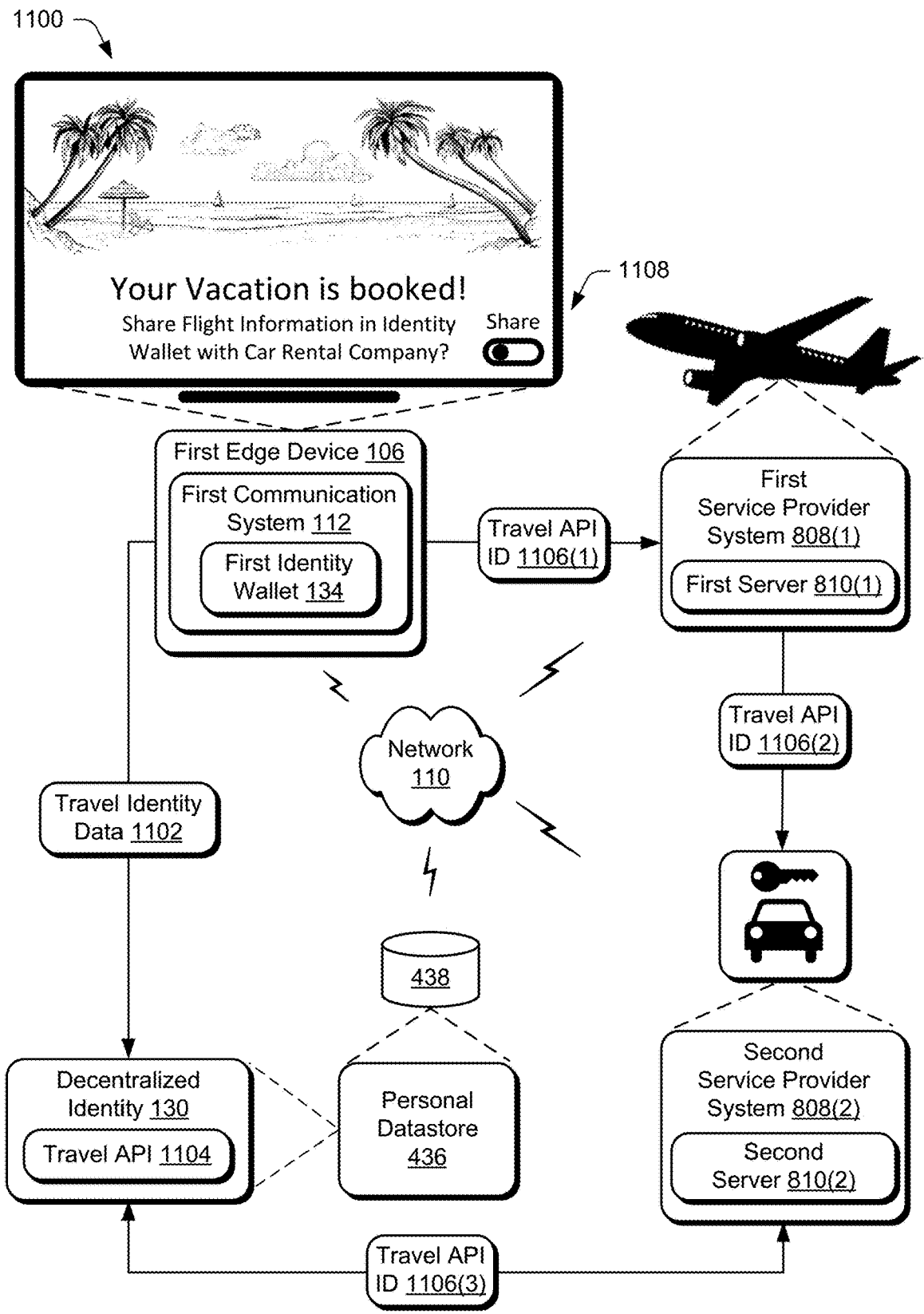
FIG. 11A is a non-limiting example showing operation of an identity wallet and decentralized identity to control access to decentralized identity data that is shared by third-party service provider systems according to an implementation of the present subject matter.

FIG. 11A is a non-limiting example 1100 showing operation of an identity wallet and decentralized identity to control access to decentralized identity data that is shared by third-party service provider systems according to an implementation of the present subject matter. In this example, the first edge device 106 and first identity wallet 134 are used to book a vacation, which includes a flight with an airline and a rental car with a rental car company. Travel identity data 1102 that describes the booking is uploaded as part of the decentralized identity 130.

In the illustrated example, a user interface is output in conjunction with the first identity wallet 134 to book the flight with a first service provider system 808(1) associated with the airline. The user interface includes a selectable option 1108 to share flight information with a car rental company. Selection of the option 1108 via the user interface causes the first identity wallet 134 to share a travel API ID 1106(1) with the first service provider system 808(1), e.g., as a decentralized identifier. The first service provider system 808(1) then shares the travel API ID 1106(2) with a second service provider system 808(2) associated with the car rental company. The car rental company, through a corresponding second server 810(2), is then permitted to access the travel API 1104 using the travel API ID 1106(3). Access is further controllable through use of rules and permissions implemented by the decentralized identity 130 as part of entity data and control logic 132. The rules set as part of the travel identity data 1102, for instance, permit sharing of the travel API ID 116(2) by the first service provider system 808(1) with the second service provider system 808(2).

Therefore, in this example the decentralized identity supports different read/write access control permissions to different third-party service provider systems. In the above example, the first service provider system 808(1) associated with the airline has "write" access to the decentralized identity data of the decentralized identity 130. The second service provider system 808(2) associated with the car rental company, on the other hand, is provided with "read only" access to receive and view flight updates and use this information to modify a car rental agreement, accordingly. Temporal considerations are also configurable, such as to limit access privileges when the trip concluded, such as when a last flight lands, a notification is triggered when an entity leave a plane based on a geolocation module 904, and so forth. A variety of other examples are also contemplated.

In another example, the decentralized identifiers are utilized in a manner similar to "cookies" to track interaction of the first entity at a respective service provider over a period of time. Cookies, for instance, are small text files that are storable on a device to track user interaction. The cookies, for instance, are usable to persist information identifying particular webpages visited, interactions with the webpages, and so forth. Information that is maintained by the cookies is therefore usable to personalize an experience of a corresponding entity. Therefore, in one example the decentralized identifiers are used to implement the cookies to track user interaction. In a first example, the decentralized identifier is used to collect information that is maintained as part of the decentralized identity describing the user interaction in order to support digital content personalization. In a second example, the decentralized identifier associated with the decentralized identity is used to uniquely identify the entity to the service provider system, e.g., to authentical the entity to ensure the entity "is who they say they are." A variety of other examples are also contemplated.

As such, the decentralized identity 130 supports increased richness and accuracy of functionality that relies on this tracking, e.g., to support recommendation generation, output data in compliance with user preferences, and so forth. The decentralized identity, for instance, supports formation of a community of service provider systems implementing proactive transfer of information between the systems. A first service provider system, for instance, may not have a desired resource available (e.g., a particular wine) and therefore leverage profile controls of the decentralized identity to pass the request for the resource to another service provider system for execution, e.g., to fulfill the request for the wine.

Figure 11B:
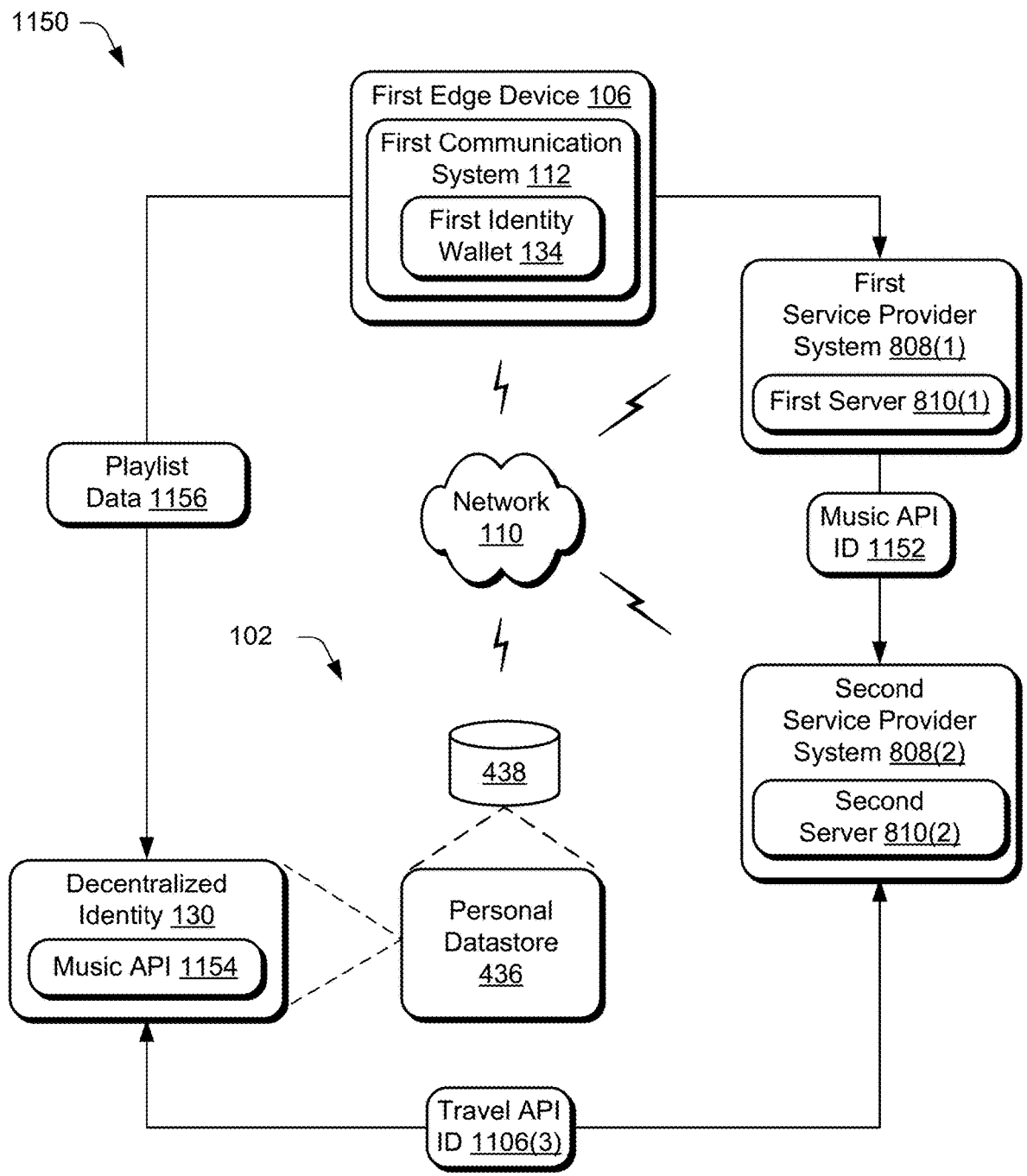
FIG. 11B is a non-limiting example showing operation of an identity wallet and decentralized identity to control access to decentralized identity data that is shared by third-party service provider systems of respective music streaming services according to an implementation of the present subject matter.

FIG. 11B is a non-limiting example 1150 showing operation of an identity wallet and decentralized identity to control access to decentralized identity data that is shared by third-party service provider systems of respective music streaming services according to an implementation of the present subject matter. In this example, the first service provider system 808(1) implements a first digital music service and the second service provider system 808(2) implements a second digital music service.

The first service provider system 808(1) shares a music API ID 1152 in this example with the second service provider system 808(2) to access a music API 1154 of the decentralized identity 130. The music API 1154 is usable to access playlist data 1156 maintained by the decentralized identity 130 on behalf of the entity associated with the first edge device 106. In this way, the second digital music service obtains access without express permission by the first edge device 106 but rather through the first service provider system 808(1) that implements the first digital music service.

Figure 12:
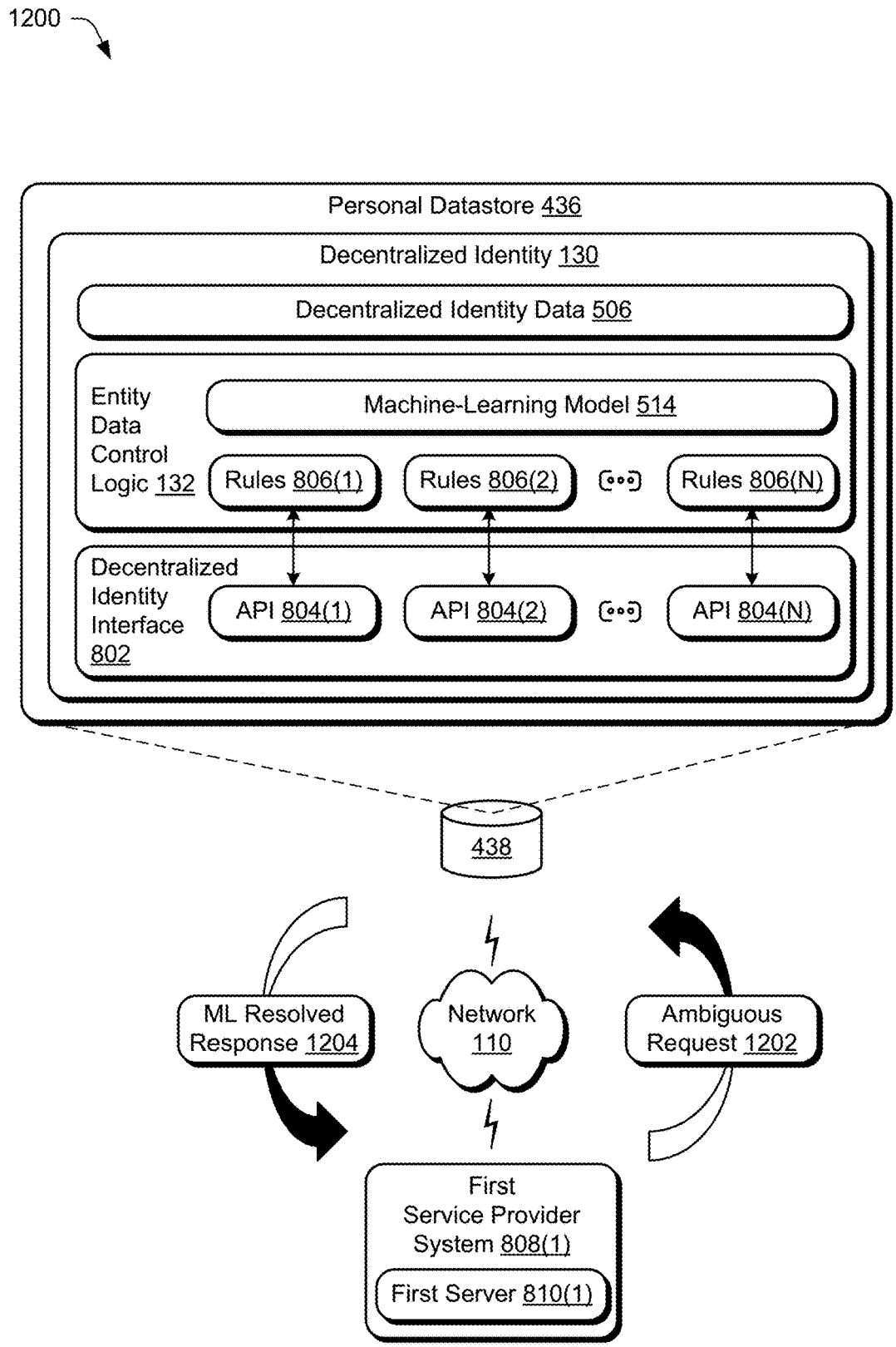
FIG. 12 is a non-limiting example showing operation of a machine-learning model as part of a decentralized identity to control access to decentralized identity data according to an implementation of the present subject matter.

FIG. 12 is a non-limiting example 1200 showing operation of a machine-learning model as part of a decentralized identity to control access to decentralized identity data according to an implementation of the present subject matter. The decentralized identity 130 as previously described includes a plurality of application programming interfaces, examples of which are illustrated as API 804(1), API 804(2), . . . , API 804(N). Each of these APIs has associated rules 806(1), 806(2), . . . , 806(N) implemented as part of the entity data and control logic 132 to control access to respective portions of the decentralized identity data 506. Through use of the different APIs 804(1)-804(N), access is provided to different portions of the decentralized identity data 506 to different service provider systems and associated servers, e.g., first, second, . . . , through "N" service provider systems 808(1), 808(2), . . . , 808(N) and associated first, second, . . . , through "N" servers 810(1), 810(2), . . . , 810(N).

In this example, the machine-learning model 514 is configured to aid in operation of the decentralized identity 130. A machine-learning model 514 refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

The machine-learning model 514, for instance, is configurable using a plurality of layers having, respectively, a plurality of nodes. The plurality of layers is configurable, for instance, to include an input layer, an output layer, and one or more hidden layers. Calculations are performed by the nodes within the layers via hidden states through a system of weighted connections that are "learned" during training of the machine-learning model 514 to implement a variety of tasks.

A machine-learning model 514, once trained, is configured to make high-level abstractions from input data by generating data-driven predictions or decisions from the input data. Output data is then generated that describes an outcome of the task. A loss function is utilized to quantify a loss associated with operations performed by the machine-learning model 514, e.g., regret, Quadratic loss function as part of a least squares technique, and so forth. A backpropagation operation is utilized as part of minimizing the loss function and thereby training the machine-learning model. Weights of the nodes, for instance, are adjusted as part of the loss function in order to minimize the loss and thereby optimize performance of the machine-learning model 514 is performance of a particular task.

In a first example, the machine-learning model 514 is configured to resolve an ambiguous request 1202 to generate an ML resolved response 1204. The decentralized identity data 506, for instance, is configurable to include a variety of data to be made accessible to the public. Upon receiving an ambiguous request 1202, the machine-learning model 514 employs natural language understanding as part of artificial intelligence to derive an underlying intention of the ambiguous request 1202. A request is received, for instance, for information regarding music preferences. The decentralized identity, however, may store data associated with music preferences regarding live events as well as music preferences regarding digital audio streamed to the entity. The machine-learning model 514 may therefore resolve the request by leveraging additional context, e.g., an identity of an originator of the request such that music playlist is provided to music streaming services whereas live band preferences are provided to ticketing services.

In another example, the machine-learning model 514 is configured to learn and adjust the rules 806(1)-806(N) and respective APIs 804(1)-804(N) as part of training and retraining the model over time. In this way, the machine-learning model 514 learns how and what data is accessed via respective APIs and is configurable to optimize performance in access, e.g., as part of load balancing, threat protection, and so forth. A variety of other examples are also contemplated.

Figure 13:
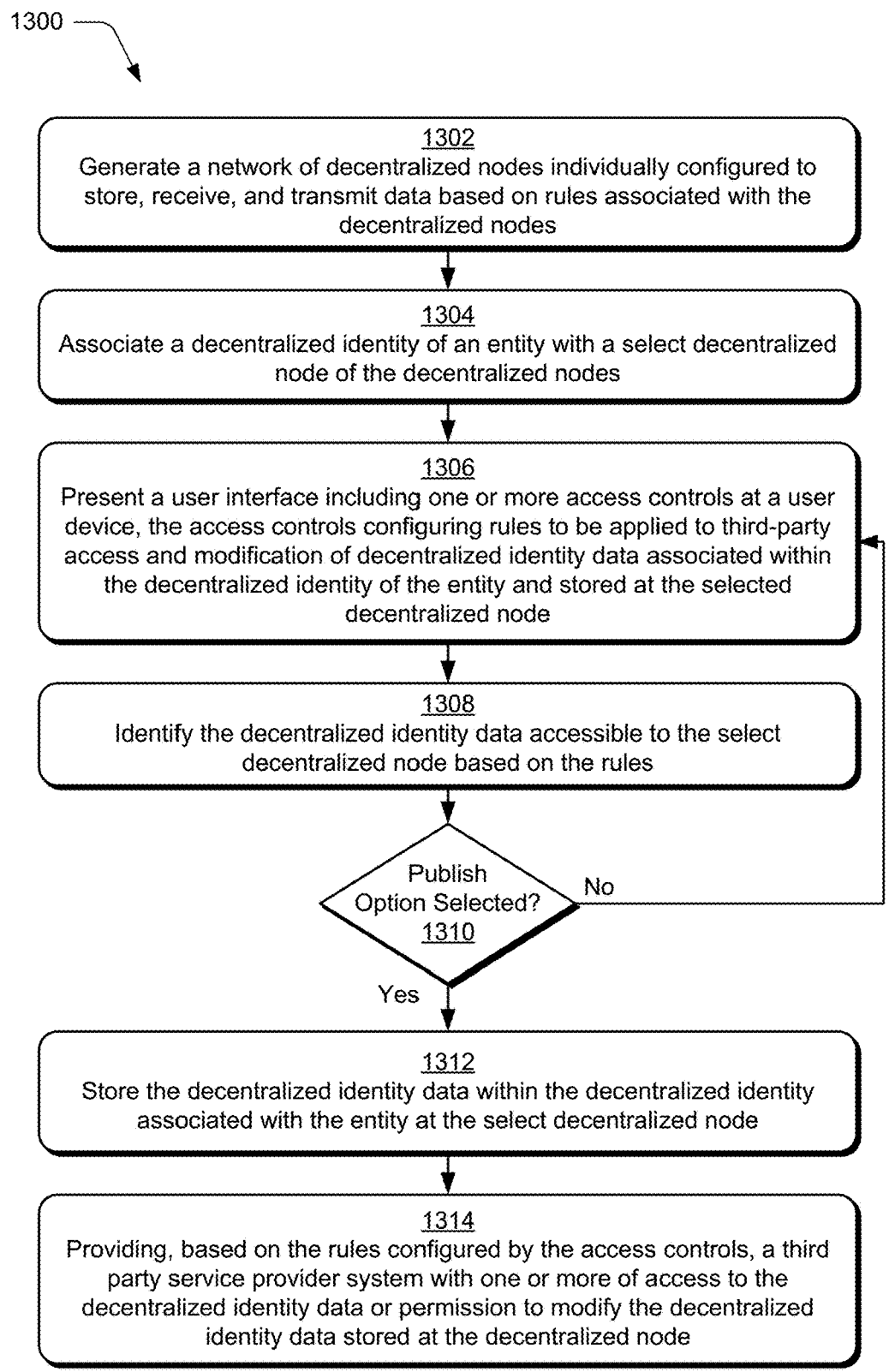
FIG. 13 is a flow diagram depicting a procedure in a non-limiting example of use of access controls in a user interface to control access to decentralized identity data associated within a decentralized identity of an entity at a selected decentralized node according to an implementation of the present subject matter.

FIG. 13 is a flow diagram depicting a procedure 1300 in a non-limiting example of use of access controls in a user interface to control access to decentralized identity data associated within a decentralized identity of an entity at a selected decentralized node according to an implementation of the present subject matter. The following discussion describes techniques that are implementable utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks.

To begin in this example, a network of decentralized nodes is generated that are individually configured to store, receive, and transmit data based on rules associated with the decentralized nodes (block 1302). As shown in FIG. 1, for instance, the decentralized platform 102 is implemented using a plurality of nodes, an example of which is illustrated as node 104.

A decentralized identity 130 of an entity is associated with a select decentralized node of the decentralized nodes 104 (block 1304), e.g., as a personal datastore 436. A first identity wallet 134, for instance, selects the node 104 from the plurality of nodes as an off-chain personal datastore that is associated with the entity 108.

A user interface is presented including one or more access controls at an edge device, the access controls configuring rules to be applied to third-party access and modification of decentralized identity data associated within the decentralized identity of the entity and stored at the selected decentralized node (block 1306). The first identity wallet 134, for instance, outputs an input user interface 504 configured to specify particular rules 508 for inclusion as part of the entity data and control logic 132 by the decentralized identity 130. The input user interface 504 is also configurable to specify particular APIs 510 to be used for this access, e.g., via respective decentralized identifiers.

Decentralized identity data is identified that is to be accessible via the select decentralized node based on the rules (block 1308). Continuing with the previous example, the input user interface 504 also includes an option to upload the decentralized identity 130.

A determination is then made as to whether a publish option is selected (decision block 1310). The first identity wallet 134, for example, includes a publish module 722 that is configured to control whether to make data uploaded to the decentralized identity 130 available as part of the decentralized identity data 506.

If the publish option is selected (yes" from decision block 1310), the decentralized identity data 506 is stored within the decentralized identity 130 associated with the entity at the select decentralized node 104 (block 1312). If the publish option is not selected ("no" from decision block 1310), the procedure continues input operations via the user interface (block 1306).

A third party service provider system, based on the rules configured by the access controls, is provided with one or more of access to the decentralized identity data or permission to modify the decentralized identity data stored at the decentralized node (block 1314). In the example of FIG. 8, for instance, a first service provider system 808(1) is provided with access to a respective API 804(1), with one or more rules 806(1) governing that access, e.g., to modify the decentralized identity data 506 or access the decentralized identity data 506.

Figure 14:
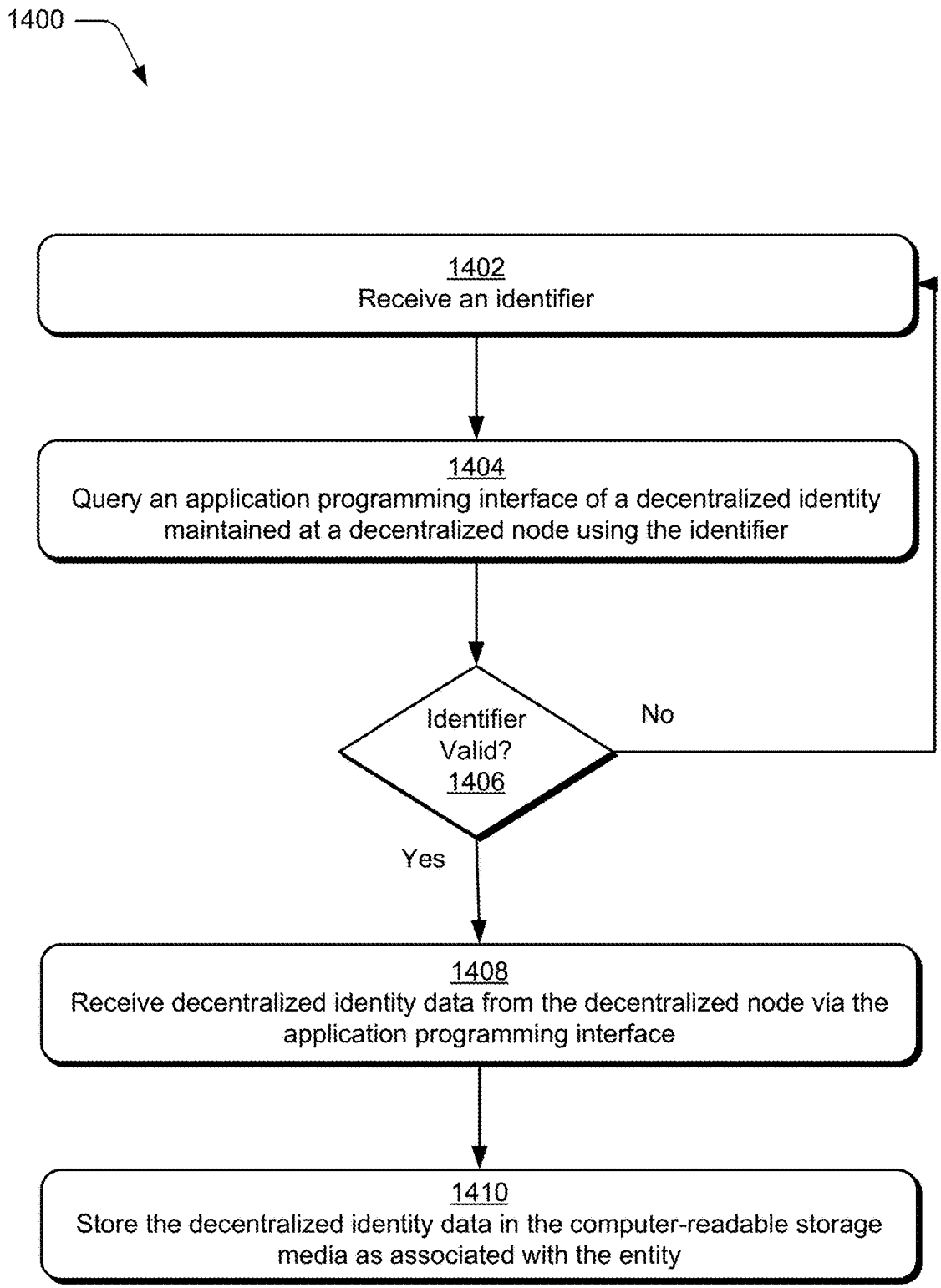
FIG. 14 is a flow diagram depicting a procedure in a non-limiting example of use of access controls in a user interface to control access to decentralized identity data associated within a decentralized identity of an entity at a selected decentralized node according to an implementation of the present subject matter.

FIG. 14 is a flow diagram depicting a procedure 1400 in a non-limiting example of use of access controls in a user interface to control access to decentralized identity data associated within a decentralized identity of an entity at a selected decentralized node according to an implementation of the present subject matter. The following discussion describes techniques that are implementable utilizing the previously described systems and devices. Aspects of the procedure is implemented in hardware, firmware, software, or a combination thereof. The procedure is shown as a set of blocks that specify operations performed by one or more devices and are not necessarily limited to the orders shown for performing the operations by the respective blocks.

An identifier is received that is associated with an entity (block 1402). In a first example, the identifier is received directly from a first identity wallet 134 maintained by an edge device associated with an entity 108 as shown in FIG. 7, e.g., the upload ID data 706, API identifier 708, and/or the decentralized identifier 710. In a second example, the identifier is received by a third-party service provider system from another third-party service provider system as shown in FIG. 11, e.g., the travel API ID 1106(2).

An application programming interface of a decentralized identity maintained at a decentralized node using the identifier (block 1404). The decentralized node is included as part of a network of decentralized nodes individually configured to store, receive, and transmit data based on rules associated with the decentralized nodes.

A determination is made as to whether the identifier is valid (decision block 1406), e.g., usable for access to the decentralized identity 130. If the identifier is not valid ("no" from decision block 1406), the procedure 1400 returns to receive another identifier. If the identifier is valid ("yes" from decision block 1406), decentralized identity data is received from the decentralized node via the application programming interface (block 1408), e.g., as part of an identity data response 1010 as shown in FIG. 10.

The decentralized identity data 506 is stored in the computer-readable storage media as associated with the entity (block 1410), e.g., in local storage by the third-party service provider system. The decentralized identity 130 is usable to support a variety of functionality, such as in conjunction with music streaming services, point-to-point payment processing, and so forth.

Figure 15:
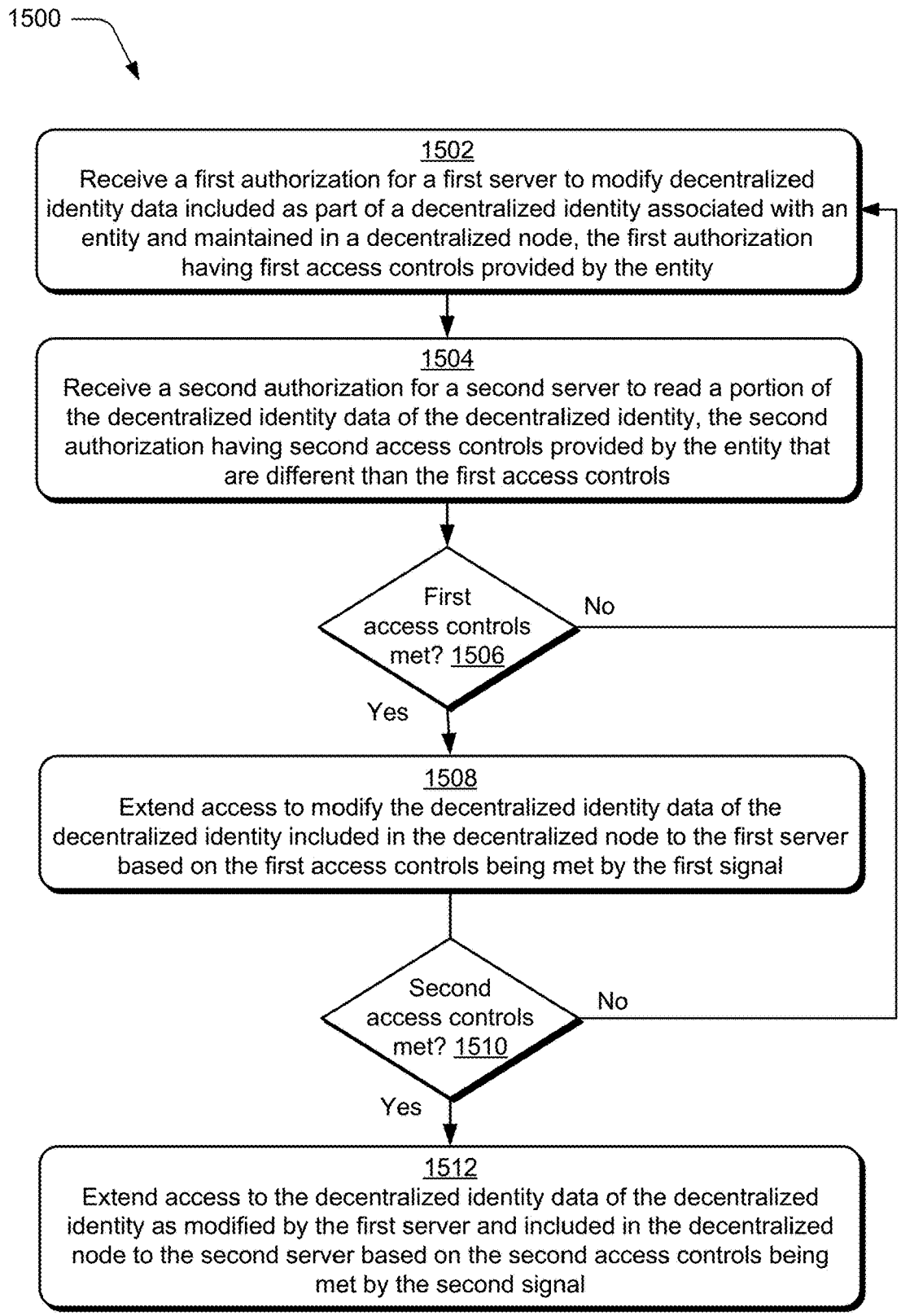
FIG. 15 is a flow diagram depicting a procedure in a non-limiting example of modification of decentralized identity data of a decentralized identity by a first server and access to the modified decentralized identity data of the decentralized identity by a second server according to an implementation of the present subject matter.

FIG. 15 is a flow diagram depicting a procedure 1500 in a non-limiting example of modification of decentralized identity data of a decentralized identity by a first server and access to the modified decentralized identity data of the decentralized identity by a second server according to an implementation of the present subject matter. The following discussion describes techniques that are implementable utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks.

To begin in this example, a first authorization is received for a first server 810(1) to modify decentralized identity data 506 included as part of a decentralized identity 130 associated with an entity 108 and maintained in a decentralized node 104. The first authorization has first access controls provided by the entity 108 (block 1502), e.g., to set rules 806(1) associated with a respective API 804(1) by the first entity 108 through interaction with the first identity wallet 134.

A second authorization is received for a second server 810(2) to read a portion of the decentralized identity data 506 of the decentralized identity 130, e.g., from the first identity wallet 134. The second authorization includes second access controls provided by the entity that are different than the first access controls (block 1504), e.g., to provide access/sharing, and so forth to different portions of the decentralized identity data 506.

A determination is then made, based on a first signal from the first server 810(1), that the first access controls are met (decision block 1506). Responsive to a determination that the first access controls are met by the first signal ("yes" from decision block 1506), access is extended to modify the decentralized identity data of the decentralized identity included in the decentralized node to the first server based on the first access controls being met by the first signal (block 1508). Otherwise ("no" from decision block 1506), the procedure 1500 terminates.

A determination is also made, based on a second signal that second access controls are met (decision block 1510). Responsive to a determination that the second access controls are met by the second signal ("yes" from decision block 1510), access to the decentralized identity data of the decentralized identity as modified by the first server and included in the decentralized node is extended to the second server based on the second access controls being met by the second signal (block 1512). Otherwise ("no" from decision block 1510), the procedure 1500 terminates. A variety of other examples are also contemplated.

Example System and Device

Figure 16:
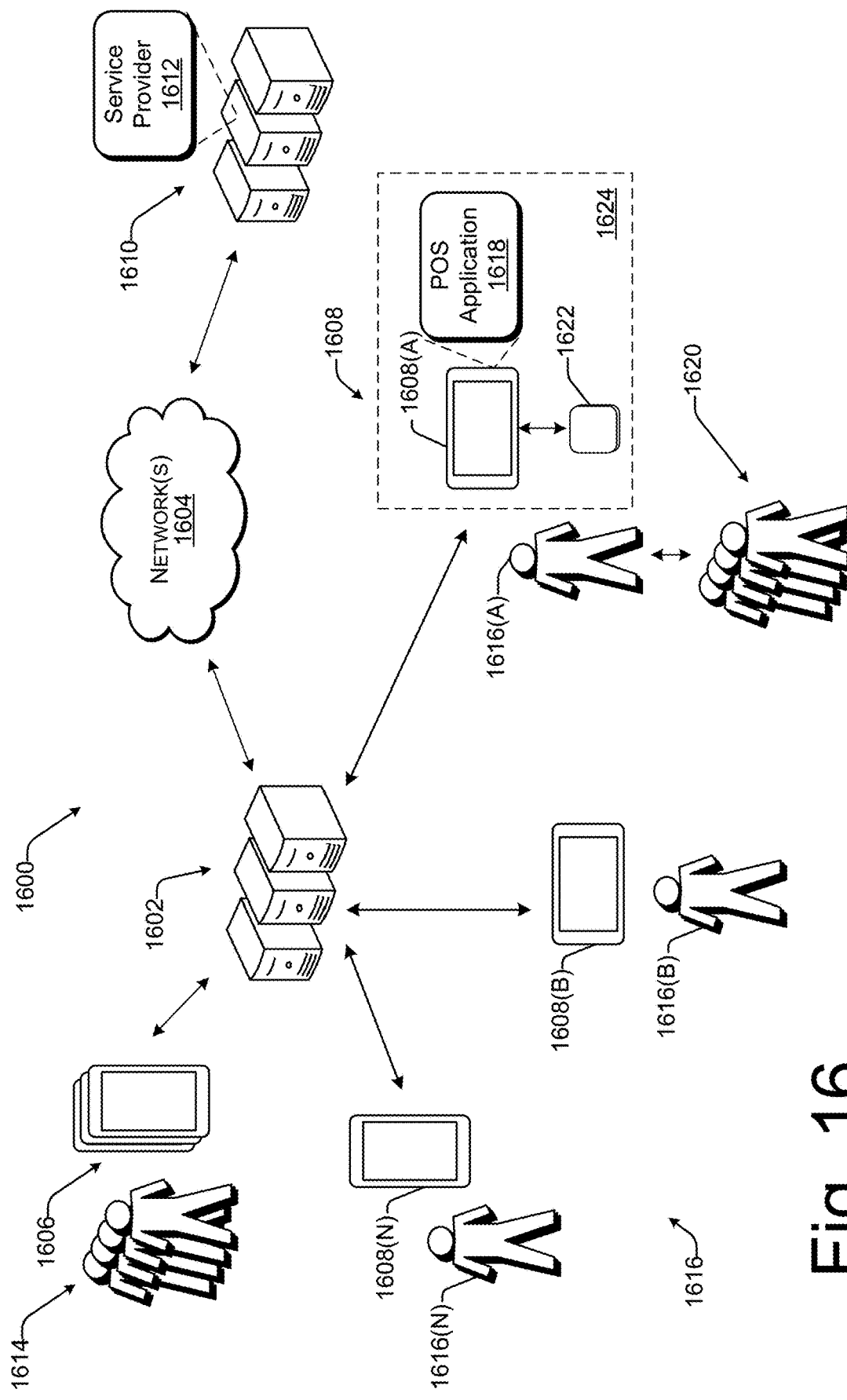
FIG. 16 is an example environment with which techniques described herein can be implemented, according to an embodiment described herein.

FIG. 16 illustrates an example environment 1600. The environment 1600 includes server(s) 1602 that can communicate over a network 1604 with user devices 1606 (which, in some examples can be merchant devices 1608 (individually, 1608(A)-1608(N))) and/or server(s) 1610 associated with third-party service provider(s). The server(s) 1602 can be associated with a service provider 1612 that can provide one or more services for the benefit of users 1614, as described below. Actions attributed to the service provider 1612 can be performed by the server(s) 1602. User devices 1606 are configurable as edge devices and the service provider with service provider systems.

The environment 1600 can include a plurality of user devices 1606, as described above. Each one of the plurality of user devices 1606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1614. The users 1614 can be referred to as customers, buyers, merchants, sellers, borrowers, employees, employers, payors, payees, couriers and so on. The users 1614 can interact with the user devices 1606 via user interfaces presented via the user devices 1606. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1606 can have an instance or versioned instance of an application, which can be downloaded from an application store, for example, which can present the user interface(s) described herein. In at least one example, a user 1614 can interact with the user interface via touch input, spoken input, or any other type of input.

As described above, in at least one example, the users 1614 can include merchants 1616 (individually, 1616(A)-1616(N)). In an example, the merchants 1616 can operate respective merchant devices 1608, which can be user devices 1606 configured for use by merchants 1616. For the purpose of this discussion, a "merchant" can be any entity that offers items (e.g., goods or services) for purchase or other means of acquisition (e.g., rent, borrow, barter, etc.). The merchants 1616 can offer items for purchase or other means of acquisition via brick-and-mortar stores, mobile stores (e.g., pop-up shops, food trucks, etc.), online stores, combinations of the foregoing, and so forth. In some examples, at least some of the merchants 1616 can be associated with a same entity but can have different merchant locations and/or can have franchise/franchisee relationships. In additional or alternative examples, the merchants 1616 can be different merchants. That is, in at least one example, the merchant 1616(A) is a different merchant than the merchant 1616(B) and/or the merchant 1616(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1608 can have an instance of a POS application 1618 stored thereon. The POS application 1618 can configure the merchant device 1608 as a POS terminal, which enables the merchant 1616(A) to interact with one or more customers 1620. As described above, the users 1614 can include customers, such as the customers 1620 shown as interacting with the merchant 1616(A). For the purpose of this discussion, a "customer" can be any entity that acquires items from merchants. While only two customers 1620 are illustrated in FIG. 16, any number of customers 1620 can interact with the merchants 1616. Further, while FIG. 16 illustrates the customers 1620 interacting with the merchant 1616(A), the customers 1620 can interact with any of the merchants 1616.

In at least one example, interactions between the customers 1620 and the merchants 1616 that involve the exchange of funds (from the customers 1620) for items (from the merchants 1616) can be referred to as "transactions." In at least one example, the POS application 1618 can determine transaction data associated with the POS transactions. Transaction data can include payment information, which can be obtained from a reader device 1622 associated with the merchant device 1608(A), user authentication data, purchase amount information, point-of-purchase information (e.g., item(s) purchased, date of purchase, time of purchase, etc.), etc. The POS application 1618 can send transaction data to the server(s) 1602 such that the server(s) 1602 can track transactions of the customers 1620, merchants 1616, and/or any of the users 1614 over time. Furthermore, the POS application 1618 can present a UI to enable the merchant 1616(A) to interact with the POS application 1618 and/or the service provider via the POS application 1618.

In at least one example, the merchant device 1608(A) can be a special-purpose computing device configured as a POS terminal (via the execution of the POS application 1618). In at least one example, the POS terminal may be connected to a reader device 1622, which is capable of accepting a variety of payment instruments, such as credit cards, debit cards, gift cards, short-range communication based payment instruments, and the like, as described below. In at least one example, the reader device 1622 can plug in to a port in the merchant device 1608(A), such as a microphone port, a headphone port, an audio-jack, a data port, or other suitable port. In additional or alternative examples, the reader device 1622 can be coupled to the merchant device 1608(A) via another wired or wireless connection, such as via a Bluetooth®, BLE, and so on. Additional details are described below with reference to FIG. 18. In some examples, the reader device 1622 can read information from alternative payment instruments including, but not limited to, wristbands and the like.

In some examples, the reader device 1622 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1622, and communicate with the server(s) 1602, which can provide, among other services, a payment processing service. The server(s) 1602 associated with the service provider can communicate with server(s) 1610, as described below. In this manner, the POS terminal and reader device 1622 may collectively process transaction(s) between the merchants 1616 and customers 1620. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1622 of the POS system 1624 are shown as separate devices, in additional or alternative examples, the POS terminal and the reader device 1622 can be part of a single device. In some examples, the reader device 1622 can have a display integrated therein for presenting information to the customers 1620. In additional or alternative examples, the POS terminal can have a display integrated therein for presenting information to the customers 1620. POS systems, such as the POS system 1624, may be mobile, such that POS terminals and reader devices may process transactions in disparate locations across the world. POS systems can be used for processing card-present transactions and card-not-present (CNP) transactions, as described below.

A card-present transaction is a transaction where both a customer 1620 and his or her payment instrument are physically present at the time of the transaction. Card-present transactions may be processed by swipes, dips, taps, or any other interaction between a physical payment instrument (e.g., a card), or otherwise present payment instrument, and a reader device 1622 whereby the reader device 1622 is able to obtain payment data from the payment instrument. A swipe is a card-present transaction where a customer 1620 slides a card, or other payment instrument, having a magnetic strip through a reader device 1622 that captures payment data contained in the magnetic strip. A dip is a card-present transaction where a customer 1620 inserts a payment instrument having an embedded microchip (i.e., chip) into a reader device 1622 first. The dipped payment instrument remains in the payment reader until the reader device 1622 prompts the customer 1620 to remove the card, or other payment instrument. While the payment instrument is in the reader device 1622, the microchip can create a one-time code which is sent from the POS system 1624 to the server(s) 1610 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1620 may tap or hover his or her payment instrument (e.g., card, electronic device such as a smart phone running a payment application, etc.) over a reader device 1622 to complete a transaction via short-range communication (e.g., NFC, RFID, Bluetooth®, BLE, etc.). Short-range communication enables the payment instrument to exchange information with the reader device 1622. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1624, the server(s) 1602, and/or the server(s) 1610 may exchange payment information and transaction data to determine whether transactions are authorized. For example, the POS system 1624 may provide encrypted payment data, user authentication data, purchase amount information, point-of-purchase information, etc. (collectively, transaction data) to server(s) 1602 over the network(s) 1604. The server(s) 1602 may send the transaction data to the server(s) 1610. As described above, in at least one example, the server(s) 1610 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1610 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1610 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1610 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1610 associated therewith), and a payment authorization message is communicated from the issuer to the POS device via a path opposite of that described above, or via an alternate path.

As described above, the server(s) 1610, which can be associated with payment service provider(s), may determine whether the transaction is authorized based on the transaction data, as well as information relating to parties to the transaction (e.g., the customer 1620 and/or the merchant 1616(A)). The server(s) 1610 may send an authorization notification over the network(s) 1604 to the server(s) 1602, which may send the authorization notification to the POS system 1624 over the network(s) 1604 to indicate whether the transaction is authorized. The server(s) 1602 may also transmit additional information such as transaction identifiers to the POS system 1624. In one example, the server(s) 1602 may include a merchant application and/or other functional components for communicating with the POS system 1624 and/or the server(s) 1610 to authorize or decline transactions.

Based on the authentication notification that is received by the POS system 1624 from server(s) 1602, the merchant 1616(A) may indicate to the customer 1620 whether the transaction has been approved. In some examples, approval may be indicated at the POS system 1624, for example, at a display of the POS system 1624. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1614 can access all of the services of the service provider. In other examples, the users 1614 can have gradated access to the services, which can be based on risk tolerance, IDV outputs, subscriptions, and so on. In at least one example, access to such services can be availed to the merchants 1616 via the POS application 1618. In additional or alternative examples, each service can be associated with its own access point (e.g., application, web browser, etc.).

The service provider can offer payment processing services for processing payments on behalf of the merchants 1616, as described above. For example, the service provider can provision payment processing software, payment processing hardware and/or payment processing services to merchants 1616, as described above, to enable the merchants 1616 to receive payments from the customers 1620 when conducting POS transactions with the customers 1620. For instance, the service provider can enable the merchants 1616 to receive cash payments, payment card payments, and/or electronic payments from customers 1620 for POS transactions and the service provider can process transactions on behalf of the merchants 1616.

As the service provider processes transactions on behalf of the merchants 1616, the service provider can maintain accounts or balances for the merchants 1616 in one or more ledgers. For example, the service provider can analyze transaction data received for a transaction to determine an amount of funds owed to a merchant 1616(A) for the transaction. In at least one example, such an amount can be a total purchase price less fees charged by the service provider for providing the payment processing services. Based on determining the amount of funds owed to the merchant 1616(A), the service provider can deposit funds into an account of the merchant 1616(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1616(A) to a bank account of the merchant 1616(A) that is held at a bank or other financial institution (e.g., associated with the server(s) 1610). Scheduled deposits can occur at a prearranged time after a POS transaction is funded, which can be a business day after the POS transaction occurred, or sooner or later. In some examples, the merchant 1616(A) can access funds prior to a scheduled deposit. For instance, the merchant 1616(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1616(A) can have a payment instrument that is linked to the stored balance that enables the merchant to access the funds without first transferring the funds from the account managed by the service provider to the bank account of the merchant 1616(A).

In at least one example, the service provider may provide inventory management services. That is, the service provider may provide inventory tracking and reporting. Inventory management services may enable the merchant 1616(A) to access and manage a database storing data associated with a quantity of each item that the merchant 1616(A) has available (i.e., an inventory). Furthermore, in at least one example, the service provider can provide catalog management services to enable the merchant 1616(A) to maintain a catalog, which can be a database storing data associated with items that the merchant 1616(A) has available for acquisition (i.e., catalog management services). In at least one example, the catalog may include a plurality of data items and a data item of the plurality of data items may represent an item that the merchant 1616(A) has available for acquisition. The service provider can offer recommendations related to pricing of the items, placement of items on the catalog, and multi-party fulfillment of the inventory.

In at least one example, the service provider can provide business banking services, which allow the merchant 1616(A) to track deposits (from payment processing and/or other sources of funds) into an account of the merchant 1616(A), payroll payments from the account (e.g., payments to employees of the merchant 1616(A)), payments to other merchants (e.g., business-to-business) directly from the account or from a linked debit card, withdrawals made via scheduled deposit and/or instant deposit, etc. Furthermore, the business banking services can enable the merchant 1616(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1616 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1616. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1612 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1614 who are unfamiliar with HTML, XML, JavaScript®, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1616. In at least one example, the service provider can recommend and/or generate content items to supplement omni-channel presences of the merchants 1616. That is, if a merchant of the merchants 1616 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1614 to set schedules for scheduling appointments and/or users 1614 to schedule appointments.

In some examples, the service provider can provide restaurant management services to enable users 1614 to make and/or manage reservations, to monitor front-of-house and/or back-of-house operations, and so on. In such examples, the merchant device(s) 1608 and/or server(s) 1602 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1614 who can travel between locations to perform services for a requesting user 1614 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1606.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1614, voice inputs into a virtual assistant or the like, to determine intents of user(s) 1614. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1614 may be new to the service provider such that the user 1614 that has not registered (e.g., subscribed to receive access to one or more services offered by the service provider) with the service provider. The service provider can offer onboarding services for registering a potential user 1614 with the service provider. In some examples, onboarding can involve presenting various questions, prompts, and the like to a potential user 1614 to obtain information that can be used to generate a profile for the potential user 1614. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1614 providing all necessary information, the potential user 1614 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1610). That is, the service provider can offer IDV services to verify the identity of users 1614 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1614 accurately identifies the customer (or potential customer), i.e., "Is the customer who they say they are?"

The service provider is capable of providing additional or alternative services and the services described above are offered as a sampling of services. In at least one example, the service provider can exchange data with the server(s) 1610 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1602) and/or the server(s) 1610 via the network(s) 1604. In some examples, the merchant device(s) 1608 are not capable of connecting with the service provider (e.g., the server(s) 1602) and/or the server(s) 1610, due to a network connectivity issue, for example. In additional or alternative examples, the server(s) 1602 are not capable of communicating with the server(s) 1610 due to network connectivity issue, for example. In such examples, devices may operate in "offline" mode where at least some payment data is stored (e.g., on the merchant device(s) 1608) and/or the server(s) 1602 until connectivity is restored and the payment data can be transmitted to the server(s) 1602 and/or the server(s) 1610 for processing.

In at least one example, the service provider can be associated with a hub, such as an order hub, an inventory hub, a fulfillment hub and so on, which can enable integration with one or more additional service providers (e.g., associated with the additional server(s) 1610). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1606 that are in communication with server(s) 1602 of the service provider. That is, techniques described herein are directed to a specific implementation—or, a practical application—of utilizing a distributed system of user devices 1606 that are in communication with server(s) 1602 of the service provider to perform a variety of services, as described above. The unconventional configuration of the distributed system described herein enables the server(s) 1602 that are remotely-located from end-users (e.g., users 1614) to intelligently offer services based on aggregated data associated with the end-users, such as the users 1614 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1614 and user devices 1606. Furthermore, such features are changed dynamically based on the profiles of the users involved interacting with the GUIs. As such, techniques described herein are directed to improvements to computing systems.

Figure 17:
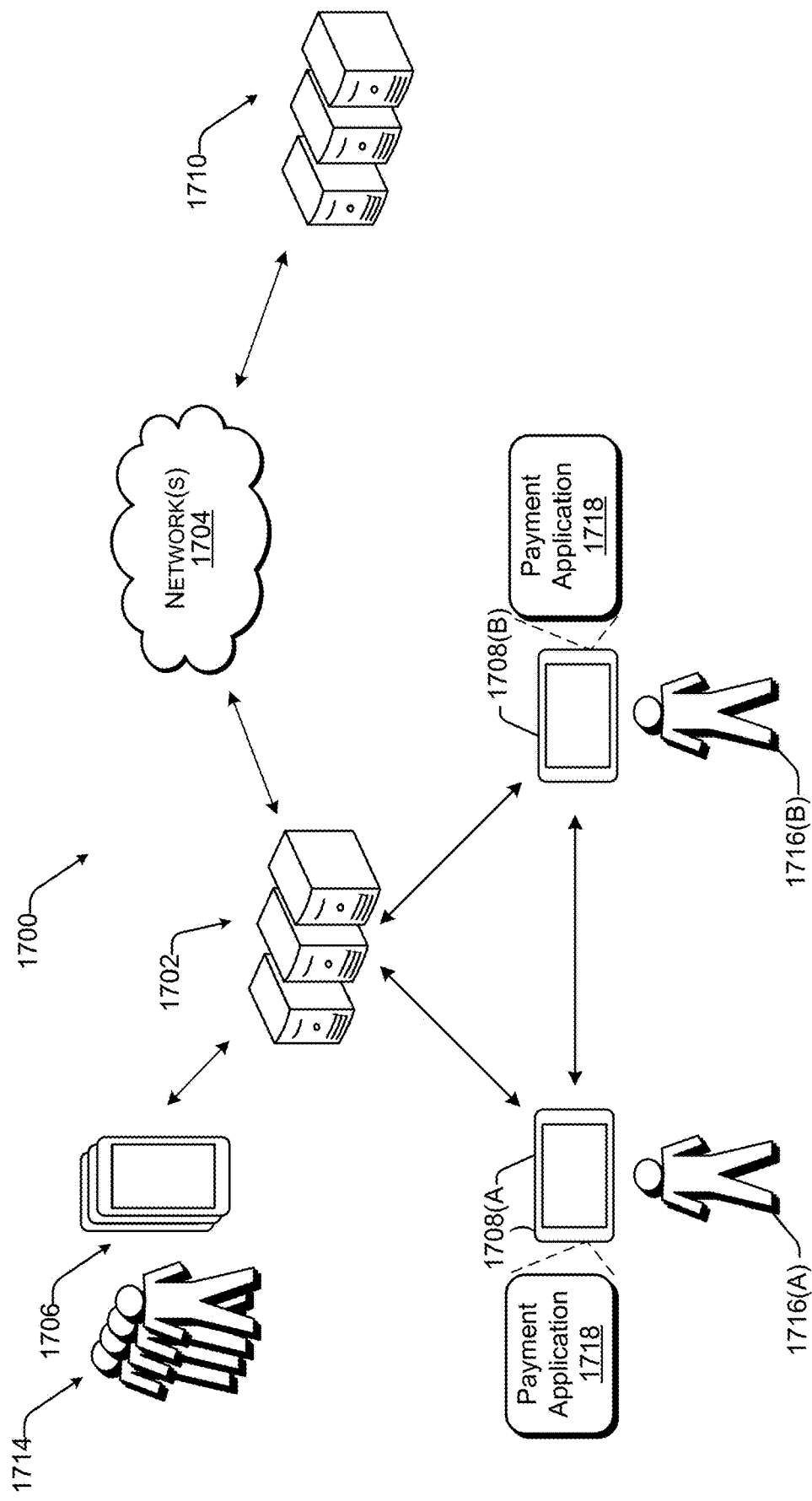
FIG. 17 is an example environment with which techniques described herein can be implemented, according to an embodiment described herein.

FIG. 17 illustrates an example environment 1700. The environment 1700 includes server(s) 1702 that can communicate over a network 1704 with user devices 1706 (which, in some examples can be user devices 1708 (individually, 1708(A), 1708(B)) and/or server(s) 1710 associated with third-party service provider(s). The server(s) 1702 can be associated with a service provider that can provide one or more services for the benefit of users 1714, as described below, such as to leverage the decentralized identity 130 as part of performance of the services. Actions attributed to the service provider can be performed by the server(s) 1702. In some examples, the service provider 1612 referenced in FIG. 16 can be the same or different than the service provider referenced in FIG. 17.

The environment 1700 can include a plurality of user devices 1706, as described above. Each one of the plurality of user devices 1706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1714. The users 1714 can be referred to as customers, buyers, merchants, sellers, borrowers, employees, employers, payors, payees, couriers and so on. The users 1714 can interact with the user devices 1706 via user interfaces presented via the user devices 1706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1706 can have an instance or versioned instance of an application, which can be downloaded from an application store, for example, which can present the user interface(s) described herein. In at least one example, a user 1714 can interact with the user interface via touch input, spoken input, or any other type of input.

In at least one example, the service provider can provide a peer-to-peer payment service that enables peer-to-peer payments between two or more users 1714. Two users, user 1716(A) and user 1716(B) are illustrated in FIG. 17 as "peers" in a peer-to-peer payment. In at least one example, the service provider can communicate with instances of a payment application 1718 (or other access point) installed on devices 1706 configured for operation by users 1714. In an example, an instance of the payment application 1718 executing on a first device 1708(A) operated by a payor (e.g., user 1716(A)) can send a request to the service provider to transfer an asset (e.g., fiat currency, non-fiat currency, digital assets, cryptocurrency, securities, gift cards, and/or related assets) from the payor to a payee (e.g., user 1716(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 18:
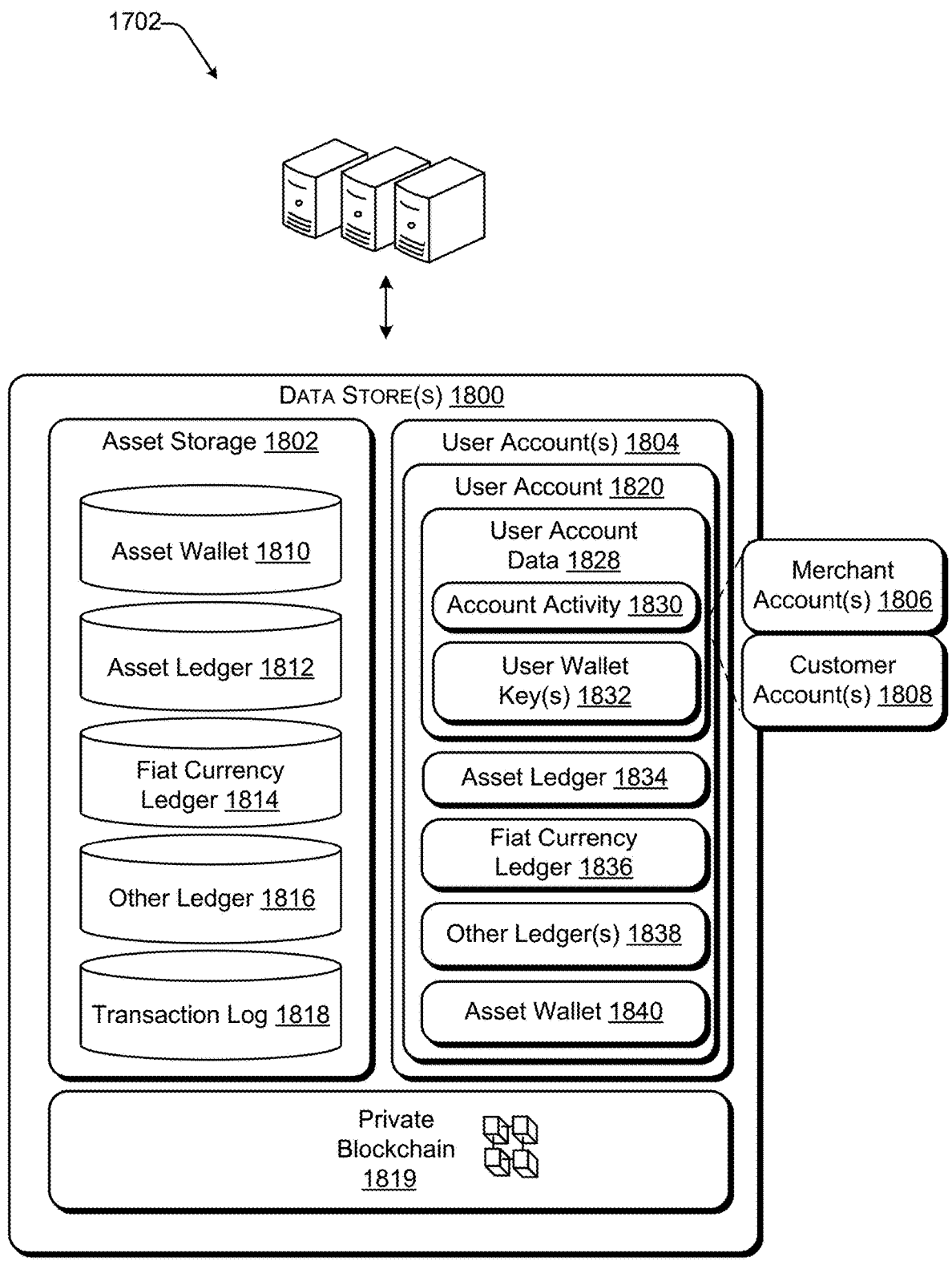
FIG. 18 is an environment associated with a ledger system with which techniques described herein can be implemented, according to an embodiment described herein.

In some examples, the service provider can utilize a ledger system to track transfers of assets between users 1714. FIG. 18, below, provides additional details associated with such a ledger system. The ledger system can enable users 1714 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1718 executing on user device(s) of payee(s). As an example, the service provider can transfer assets from an account of user 1716(A) to an account of the user 1716(B) and can send a notification to the user device 1708(B) of the user 1716(B) for presentation via a user interface. The notification can indicate that a transfer is in process, a transfer is complete, or the like. In some examples, the service provider can send additional or alternative information to the instances of the payment application 1718 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1702 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1718 executing on the user devices 1706. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 17 or a third-party service provider associated with the server(s) 1710. In examples where the content provider is a third-party service provider, the server(s) 1710 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 17. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1706 (e.g., mobile device or conventional personal computer (PC)) based on instructions transmitted to and from the server(s) 1702 (which, in such an example can be called a "messaging server"). In some instances, the messaging application can include a payment application with messaging capability that enables users of the payment application to communicate with one another. In such instances, the payment application can be executed on a user device 1706 based on instructions transmitted to and from the server(s) 1702 (e.g., the payment service discussed in this description or another payment service that supports payment transactions). In some examples, the messaging application can be provided by a third-party service provider associated with the server(s) 1710. In examples where the messaging application is a third-party service provider, the server(s) 1710 can be accessible via one or more APIs or other integrations.

As described above, the service provider can facilitate peer-to-peer transactions, which can enable users 1714 to transfer fiat currency, non-fiat currency, cryptocurrency, securities, or other assets, or portions thereof, to other users 1714. In at least one example, individual users can be associated with user accounts. Additional details associated with user accounts and the transfer of assets between users 1714 are described below with reference to FIG. 18.

Furthermore, the service provider of FIG. 17 can enable users 1714 to perform banking transactions via instances of the payment application 1718. For example, users can configure direct deposits or other deposits for adding assets to their various ledgers/balances. Further, users 1714 can configure bill pay, recurring payments, and/or the like using assets associated with their accounts. In addition to sending and/or receiving assets via peer-to-peer transactions, users 1714 buy and/or sell assets via asset networks such as cryptocurrency networks, securities networks, and/or the like.

FIG. 18 illustrates example data store(s) 1800 that can be associated with the server(s) 1702. These ledgers and wallets are configurable to implement the digital wallets and identity wallets previously described above.

In at least one example, the data store(s) 1800 can store assets in an asset storage 1802, as well as data in user account(s) 1804. In some examples, user account(s) 1804 can include merchant account(s) 1806, and/or customer account(s) 1808. In at least one example, the asset storage 1802 can be used to store assets managed by the service provider of FIG. 17. In at least one example, the asset storage 1802 can be used to record whether individual of the assets are registered to users. For example, the asset storage 1802 can include an asset wallet 1810 for storing records of assets owned by the service provider of FIG. 17, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1710 can be associated therewith. In some examples, the asset wallet 1810 can communicate with the asset network via one or more components associated with the server(s) 1702.

The asset wallet 1810 can be associated with one or more addresses and can vary addresses used to acquire assets (e.g., from the asset network(s)) so that its holdings are represented under a variety of addresses on the asset network. In examples where the service provider of FIG. 17 has its own holdings of cryptocurrency (e.g., in the asset wallet 1810), a user can acquire cryptocurrency directly from the service provider of FIG. 17. In some examples, the service provider of FIG. 17 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1802 may contain ledgers that store records of assignments of assets to users 1714. Specifically, the asset storage 1802 may include asset ledger 1812, fiat currency ledger 1814, and other ledger(s) 1816, which can be used to record transfers of assets between users 1714 of the service provider and/or one or more third-parties (e.g., merchant network(s), payment card network(s), ACH network(s), equities network(s), the asset network, securities networks, etc.). In doing so, the asset storage 1802 can maintain a running balance of assets managed by the service provider of FIG. 17. The ledger(s) of the asset storage 1802 can further indicate some of the running balance for each of the ledger(s) stored in the asset storage 1802 is assigned or registered to one or more user account(s) 1804.

In at least one example, the asset storage 1802 can include transaction logs 1818, which can include records of past transactions involving the service provider of FIG. 17. In at least one example, transaction data, as described herein, can be stored in association with the transaction logs 1818.

In some examples, the data store(s) 1800 can store a private blockchain 1819. A private blockchain 1819 can function to record sender addresses, recipient addresses, public keys, values of cryptocurrency transferred, and/or can be used to verify ownership of cryptocurrency tokens to be transferred. In some examples, the service provider of FIG. 17 can record transactions taking place within the service provider of FIG. 17 involving cryptocurrency until the number of transactions has exceeded a determined limit (e.g., number of transactions, storage space allocation, etc.). Based at least in part on determining that the limit has been reached, the service provider of FIG. 17 can publish the transactions in the private blockchain 1819 to a public blockchain (e.g., associated with the asset network), where miners can verify the transactions and record the transactions to blocks on the public blockchain. In at least one example, the service provider of FIG. 17 can participate as miner(s) at least for its transactions to be posted to the public blockchain.

In at least one example, the data store(s) 1800 can store and/or manage accounts, such as user account(s) 1804, merchant account(s) 1806, and/or customer account(s) 1808. In at least one example, the user account(s) 1804 may store records of user accounts associated with the users 1714. In at least one example, the user account(s) 1804 can include a user account 1820, which can be associated with a user (of the users 1714). Other user accounts of the user account(s) 1804 can be similarly structured to the user account 1820, according to some examples. In other examples, other user accounts may include more or less data and/or account information than that provided by the user account 1820. In at least one example, the user account 1820 can include user account data 1828, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1828 can include account activity 1830 and user wallet key(s) 1832. The account activity 1830 may include a transaction log for recording transactions associated with the user account 1820. In some examples, the user wallet key(s) 1832 can include a public-private key-pair and a respective address associated with the asset network or other asset networks. In some examples, the user wallet key(s) 1832 may include one or more key pairs, which can be unique to the asset network or other asset networks.

In addition to the user account data 1828, the user account 1820 can include ledger(s) for account(s) managed by the service provider of FIG. 17, for the user. For example, the user account 1820 may include an asset ledger 1814, a fiat currency ledger 1816, and/or one or more other ledgers 1816. The ledger(s) can indicate that a corresponding user utilizes the service provider of FIG. 17 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 17.

In some examples, the asset ledger 1814 can store a balance for each of one or more cryptocurrencies (e.g., Bitcoin, Ethereum, Litecoin, etc.) registered to the user account 1820. In at least one example, the asset ledger 1814 can further record transactions of cryptocurrency assets associated with the user account 1820. For example, the user account 1820 can receive cryptocurrency from the asset network using the user wallet key(s) 1832. In some examples, the user wallet key(s) 1832 may be generated for the user upon request. User wallet key(s) 1832 can be requested by the user in order to send, exchange, or otherwise control the balance of cryptocurrency held by the service provider of FIG. 17 (e.g., in the asset wallet 1810) and registered to the user. In some examples, the user wallet key(s) 1832 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 17 and the value is credited as a balance in asset ledger 1814), by purchasing currency in the form associated with the account using currency in a different form (e.g., buying a value of cryptocurrency from the service provider of FIG. 17 using a value of fiat currency reflected in fiat currency ledger 1816, and crediting the value of cryptocurrency in asset ledger 1814), or by conducting a transaction with another user (customer or merchant) of the service provider of FIG. 17 wherein the account receives incoming currency (which can be in the form associated with the account or a different form, in which the incoming currency may be converted to the form associated with the account). In some examples, the user account data 1828 can include preferences for maintaining balances of individual of the ledgers. For example, the service provider of FIG. 17 can automatically debit the fiat currency ledger 1816 to increase the asset ledger 1814, or another account associated with the user whenever the cryptocurrency balance (e.g., of the asset ledger 1814) falls below a stated level (e.g., a threshold). Conversely, in some embodiments, the service provider of FIG. 17 can automatically credit the fiat currency ledger 1816 to decrease the asset ledger 1814 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 17 (i.e., an external account). In at least one example, the user can transfer all or a portion of a balance of the cryptocurrency stored in the third-party cryptocurrency wallet to the service provider of FIG. 17. Such a transaction can require the user to transfer an amount of the cryptocurrency in a message signed by user's private key to an address provided by the service provider of FIG. 17. In at least one example, the transaction can be sent to miners to bundle the transaction into a block of transactions and to verify the authenticity of the transactions in the block. Once a miner has verified the block, the block is written to a public, distributed blockchain where the service provider of FIG. 17 can then verify that the transaction has been confirmed and can credit the user's asset ledger 1814 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 17. As described above, in some examples, the service provider of FIG. 17 can acquire cryptocurrency from a third-party source. In such examples, the asset wallet 1810 can be associated with different addresses and can vary addresses used to acquire cryptocurrency so that its holdings are represented under a variety of addresses on a blockchain. When the service provider of FIG. 17 has their own holdings of cryptocurrency, users can acquire cryptocurrency directly from the service provider of FIG. 17. In some examples, the service provider of FIG. 17 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 17 has its own cryptocurrency assets, cryptocurrency transferred in a transaction (e.g., data with address provided for receipt of transaction and a balance of cryptocurrency transferred in the transaction) can be stored in the asset wallet 1810. In at least one example, the service provider of FIG. 17 can credit the asset ledger 1814 of the user. Additionally, while the service provider of FIG. 17 recognizes that the user retains the value of the transferred cryptocurrency through crediting the asset ledger 1814, any person that inspects the blockchain will see the cryptocurrency as having been transferred to the service provider of FIG. 17. In some examples, the asset wallet 1810 can be associated with many different addresses. In such examples, any person that inspects the blockchain may not easily associate all cryptocurrency stored in asset wallet 1810 as belonging to the same entity. It is this presence of a private ledger that is used for real-time transactions and maintained by the service provider of FIG. 17, combined with updates to the public ledger at other times, that allows for extremely fast transactions using cryptocurrency to be achieved. In some examples, the "private ledger" can refer to the asset ledger 1812, which in some examples, can utilize the private blockchain 1819, as described herein. The "public ledger" can correspond to a public blockchain associated with the asset network.

In at least one example, a user's asset ledger 1814, fiat currency ledger 1816, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1814. In some examples, a user can receive fiat currency or another currency in the form of payment for a transaction with another user. In at least one example, at least a portion of such funds can be converted into cryptocurrency by the service provider of FIG. 17 and used to fund the asset ledger 1814 of the user.

As addressed above, in some examples, users can also have other accounts maintained by the service provider of FIG. 17. For example, a user can also have an account in U.S. dollars, which can be tracked, for example, via the fiat currency ledger 1816. Such an account can be funded by transferring money from a bank account at a third-party bank to an account maintained by the service provider of FIG. 17 as is conventionally known. In some examples, a user can receive fiat currency in the form of payment for a transaction with another user. In such examples, at least a portion of such funds can be used to fund the fiat currency ledger 1816.

In some examples, a user can have one or more internal payment cards registered with the service provider of FIG. 17. Internal payment cards can be linked to one or more of the accounts associated with the user account 1820. In some embodiments, options with respect to internal payment cards can be adjusted and managed using an application (e.g., the payment application 1718).

In at least one example, as described above, each ledger can correspond to an account of the user that is managed by the service provider of FIG. 17. In at least one example, individual of the accounts can be associated with a wallet or a stored balance for use in payment transactions, peer-to-peer transactions, payroll payments, etc.

In at least one example, the user account 1820 can be associated with an asset wallet 1840. The asset wallet 1840 of the user can be associated with account information that can be stored in the user account data 1828 and, in some examples, can be associated with the user wallet key(s) 1832. In at least one example, the asset wallet 1840 can store data indicating an address provided for receipt of a cryptocurrency transaction. In at least one example, the balance of the asset wallet 1840 can be based at least in part on a balance of the asset ledger 1814. In at least one example, funds availed via the asset wallet 1840 can be stored in the asset wallet 1840 or the asset wallet 1810. Funds availed via the asset wallet 1810 can be tracked via the asset ledger 1814. The asset wallet 1840, however, can be associated with additional cryptocurrency funds.

In at least one example, when the service provider of FIG. 17 includes a private blockchain 1819 for recording and validating cryptocurrency transactions, the asset wallet 1840 can be used instead of, or in addition to, the asset ledger 1814. For example, at least one example, a merchant can provide the address of the asset wallet 1840 for receiving payments. In an example where a customer is paying in cryptocurrency and the customer has their own cryptocurrency wallet account associated with the service provider of FIG. 17, the customer can send a message signed by its private key including its wallet address (i.e., of the customer) and identifying the cryptocurrency and value to be transferred to the merchant's asset wallet 1840. The service provider of FIG. 17 can complete the transaction by reducing the cryptocurrency balance in the customer's cryptocurrency wallet and increasing the cryptocurrency balance in the merchant's asset wallet 1840. In addition to recording the transaction in the respective cryptocurrency wallets, the transaction can be recorded in the private blockchain 1819 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can involve transfer by a user of an amount of cryptocurrency in a message signed by the user's private key to an address of the cryptocurrency wallet account. The transferred amount of cryptocurrency can then be within the cryptocurrency wallet account for use in later transactions.

While the asset ledger 1814 and/or asset wallet 1840 are each described above with reference to cryptocurrency, the asset ledger 1814 and/or asset wallet 1840 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 17 is an aspect of the technology disclosed that enables technical advantages of increased processing speed and improved security.

Figure 19:
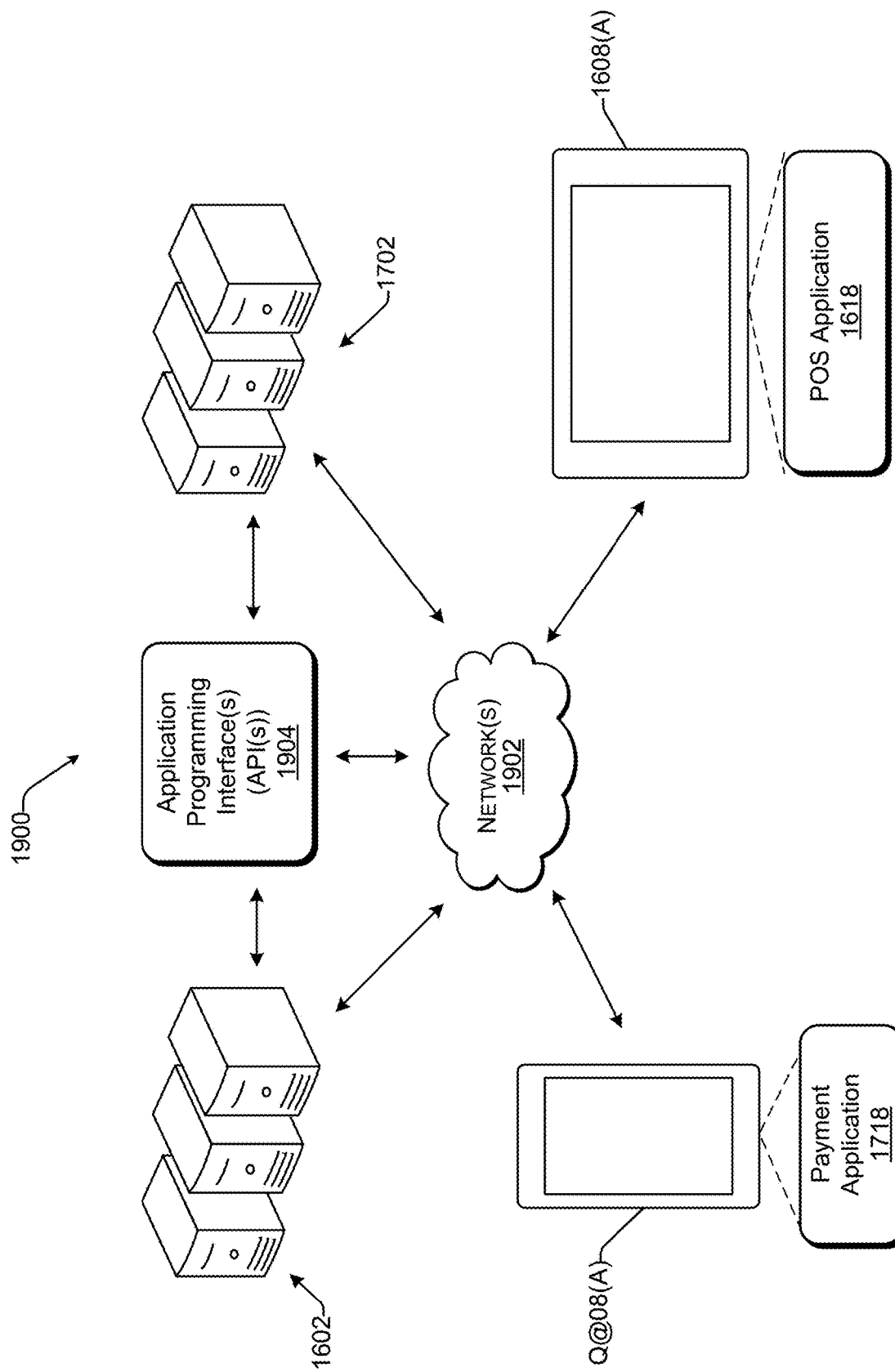
FIG. 19 is an example environment in which the environments of FIGS. 16 and 17 can be integrated to enable payments at the point-of-sale using assets associated with user accounts in the peer-to-peer environment of FIG. 18 with which techniques described herein can be implemented, according to an embodiment described herein.

FIG. 19 illustrates an example environment 1900 wherein the environment 1600 and the environment 1700 can be integrated to enable payments at the point-of-sale using assets associated with user accounts in the peer-to-peer environment of FIG. 17. As illustrated, each of the components can communicate with one another via one or more networks 1902. In some examples, one or more APIs 1904 or other functional components can be used to facilitate such communication.

In at least one example, the example environment 1900 can enable contactless payments, via integration of peer-to-peer payment, or other payment making, platform(s) and payment processing platform(s), are described herein. For the purpose of FIG. 18, the environment 1600 can refer to a payment processing platform and the environment 1700 can refer to a peer-to-peer payment, or payment making, platform. In an example, such an integration can enable a customer to participate in a transaction via their own computing device instead of interacting with a merchant device of a merchant, such as the merchant device 1608(A). In such an example, the POS application 1618, associated with a payment processing platform and executable by the merchant device 1608(A) of the merchant, can present a Quick Response (QR) code, or other code that can be used to identify a transaction (e.g., a transaction code), in association with a transaction between the customer and the merchant. The QR code, or other transaction code, can be provided to the POS application 1618 via an API associated with the peer-to-peer payment platform. In an example, the customer can utilize their own computing device, such as the user device 1708(A), to capture the QR code, or the other transaction code, and to provide an indication of the captured QR code, or other transaction code, to server(s) 1602 and/or server(s) 1702.

Based at least in part on the integration of the peer-to-peer payment platform and the payment processing platform (e.g., via the API), the server(s) 1602 and/or 1702 associated with each can exchange communications with each other—and with a payment application 1718 associated with the peer-to-peer payment platform and/or the POS application 1618—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1708(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1708(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1618 and the payment application 1718, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1708(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1618, associated with a payment processing platform, on the merchant device 1608(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1608(A) can present a QR code, or other transaction code, that can be associated with a peer-to-peer payment platform. The customer can use a camera associated with the user device 1708(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1618, associated with a payment processing platform, on the merchant device 1608(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1618 can cause a text message with a resource locator (e.g., uniform resource locator (URL)) that can be associated with a peer-to-peer payment platform to be sent to the user device 1708(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1708(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1618 of a merchant device 1608(A) at a brick-and-mortar store of a merchant to a payment application 1718 of a user device 1708(A) of a customer to enable the customer to participate in a transaction via their own computing device. For instance, in a "scan to pay" example as described above, based at least in part on capturing the QR code, or other transaction code, via the user device 1708(A), the payment processing platform can provide transaction data to the peer-to-peer payment platform for presentation via the payment application 1718 on the user device 1708(A). In some examples, the customer can watch items being added to their cart (e.g., via a user interface presented via the payment application). As an item is added to a virtual cart by the merchant—via the POS application 1618 on the merchant device 1608(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1718 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1708(A) during or after payment of the transaction.

In some examples, based at least in part on capturing the QR code, or other transaction code, the payment processing platform can provide transaction data to the peer-to-peer payment platform for presentation via the payment application 1718 on the computing device of the customer, such as the user device 1708(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1718 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1618, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1718 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

FIG. 20 depicts an illustrative block diagram illustrating a system 2000 for performing techniques described herein. The system 2000 includes a user device 2002, that communicates with server computing device(s) (e.g., server(s) 2004) via network(s) 2006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 2002 is illustrated, in additional or alternate examples, the system 2000 can have multiple user devices. These devices are configurable to implement the edge devices, servers, and service provider system as previously described.

In at least one example, the user device 2002 can be any suitable type of computing device, e.g., portable, semi-portable, semi-stationary, or stationary. Some examples of the user device 2002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 2002 can be any computing device capable of sending communications and performing the functions according to the techniques described herein. The user device 2002 can include devices, e.g., payment card readers, or components capable of accepting payments, as described below.

In the illustrated example, the user device 2002 includes one or more processors 2008, one or more computer-readable media 2010, one or more communication interface(s) 2012, one or more input/output (I/O) devices 2014, a display 2016, and sensor(s) 2018.

In at least one example, each processor 2008 can itself comprise one or more processors or processing cores. For example, the processor(s) 2008 can be implemented as one or more microprocessors, microcomputers, microcontrollers, digital signal processors, central processing units, state machines, logic circuitries, and/or any devices that manipulate signals based on operational instructions. In some examples, the processor(s) 2008 can be one or more hardware processors and/or logic circuits of any suitable type specifically programmed or configured to execute the algorithms and processes described herein. The processor(s) 2008 can be configured to fetch and execute computer-readable processor-executable instructions stored in the computer-readable media 2010.

Depending on the configuration of the user device 2002, the computer-readable media 2010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 2010 can include, but is not limited to, RAM, ROM, EEPROM, flash memory, solid-state storage, magnetic disk storage, optical storage, and/or other computer-readable media technology. Further, in some examples, the user device 2002 can access external storage, such as RAID storage systems, storage arrays, network attached storage, storage area networks, cloud storage, or any other medium that can be used to store information and that can be accessed by the processor(s) 2008 directly or through another computing device or network. Accordingly, the computer-readable media 2010 can be computer storage media able to store instructions, components or components that can be executed by the processor(s) 2008. Further, when mentioned, non-transitory computer-readable media exclude media such as energy, carrier signals, electromagnetic waves, and signals per se.

The computer-readable media 2010 can be used to store and maintain any number of functional components that are executable by the processor(s) 2008. In some implementations, these functional components comprise instructions or programs that are executable by the processor(s) 2008 and that, when executed, implement operational logic for performing the actions and services attributed above to the user device 2002. Functional components stored in the computer-readable media 2010 can include a user interface 2020 to enable users to interact with the user device 2002, and thus the server(s) 2004 and/or other networked devices. In at least one example, the user interface 2020 can be presented via a web browser, or the like. In other examples, the user interface 2020 can be presented via an application, such as a mobile application or desktop application, which can be provided by a service provider associated with the server(s) 2004, or which can be an otherwise dedicated application. In some examples, the user interface 2020 can be a user interface as shown in FIGS. 5 and 6. In at least one example, a user can interact with the user interface via touch input, spoken input, gesture, or any other type of input. The word "input" is also used to describe "contextual" input that may not be directly provided by the user via the user interface 2020. For example, user's interactions with the user interface 2020 are analyzed using, e.g., natural language processing techniques, to determine context or intent of the user, which may be treated in a manner similar to "direct" user input.

Depending on the type of the user device 2002, the computer-readable media 2010 can also optionally include other functional components and data, such as other components and data 2022, which can include programs, drivers, etc., and the data used or generated by the functional components. In addition, the computer-readable media 2010 can also store data, data structures and the like, that are used by the functional components. Further, the user device 2002 can include many other logical, programmatic and physical components, of which those described are merely examples that are related to the discussion herein.

In at least one example, the computer-readable media 2010 can include additional functional components, such as an operating system 2024 for controlling and managing various functions of the user device 2002 and for enabling basic user interactions.

The communication interface(s) 2012 can include one or more interfaces and hardware components for enabling communication with various other devices, such as over the network(s) 2006 or directly. For example, communication interface(s) 2012 can enable communication through one or more network(s) 2006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 2006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 2002 can further include one or more input/output (I/O) devices 2014. The I/O devices 2014 can include speakers, a microphone, a camera, and various user controls (e.g., buttons, a joystick, a keyboard, a keypad, etc.), a haptic output device, and so forth. The I/O devices 2014 can also include attachments that leverage the accessories (audio-jack, USB-C, Bluetooth, etc.) to connect with the user device 2002.

In at least one example, user device 2002 can include a display 2016. Depending on the type of computing device(s) used as the user device 2002, the display 2016 can employ any suitable display technology. For example, the display 2016 can be a liquid crystal display, a plasma display, a light emitting diode display, an OLED (organic light-emitting diode) display, an electronic paper display, or any other suitable type of display able to present digital content thereon. In at least one example, the display 2016 can be an augmented reality display, a virtual reality display, or any other display able to present and/or project digital content. In some examples, the display 2016 can have a touch sensor associated with the display 2016 to provide a touchscreen display configured to receive touch inputs for enabling interaction with a graphic interface presented on the display 2016. Accordingly, implementations herein are not limited to any particular display technology. Alternatively, in some examples, the user device 2002 may not include the display 2016, and information can be presented by other means, such as aurally, haptically, etc.

In addition, the user device 2002 can include sensor(s) 2018. The sensor(s) 2018 can include a GPS device able to indicate location information. Further, the sensor(s) 2018 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 2002 can include various other components that are not shown, examples of which include removable storage, a power source, such as a battery and power control unit, a barcode scanner, a printer, a cash drawer, and so forth.

In addition, in some examples, the user device 2002 can include, be connectable to, or otherwise be coupled to a reader device 2026, for reading payment instruments and/or identifiers associated with payment objects. In some examples, as described above, the reader device 2026 can plug in to a port in the user device 2002, such as a microphone port, a headphone port, an audio-jack, a data port, or other suitable port. In additional or alternative examples, the reader device 2026 can be coupled to the user device 2002 via another wired or wireless connection, such as via a Bluetooth®, BLE, and so on. The reader device 2026 can include a read head for reading a magnetic strip of a payment card, and further can include encryption technology for encrypting the information read from the magnetic strip. Additionally or alternatively, the reader device 2026 can be an EMV payment reader, which in some examples, can be embedded in the user device 2002. Moreover, numerous other types of readers can be employed with the user device 2002 herein, depending on the type and configuration of the user device 2002.

The reader device 2026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 2026 may include hardware implementation, such as slots, magnetic tracks, and rails with one or more sensors or electrical contacts to facilitate detection and acceptance of a payment instrument. That is, the reader device 2026 may include hardware implementations to enable the reader device 2026 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 2026 may also include a biometric sensor to receive and process biometric characteristics and process them as payment instruments, given that such biometric characteristics are registered with the payment service and connected to a financial account with a bank server.

The reader device 2026 may include processing unit(s), computer-readable media, a reader chip, a transaction chip, a timer, a clock, a network interface, a power supply, and so on. The processing unit(s) of the reader device 2026 may execute one or more components and/or processes to cause the reader device 2026 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 2026, the computer-readable media may include volatile memory (such as RAM), non-volatile memory (such as ROM, flash memory, miniature hard drive, memory card, or the like), or some combination thereof. In at least one example, the computer-readable media of the reader device 2026 may include at least one component for performing various functions as described herein.

The reader chip may perform functionalities to control the operations and processing of the reader device 2026. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 2006, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 2026. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 2002, which can be a POS terminal, and the reader device 2026 are shown as separate devices, in additional or alternative examples, the user device 2002 and the reader device 2026 can be part of a single device, which may be a battery-operated device. In such an example, components of both the user device 2002 and the reader device 2026 may be associated with the single device. In some examples, the reader device 2026 can have a display integrated therewith, which can be in addition to (or as an alternative of) the display 2016 associated with the user device 2002.

The server(s) 2004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 2004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 2004 can include one or more processors 2028, one or more computer-readable media 2030, one or more I/O devices 2032, and one or more communication interfaces 2034. Each processor 2028 can be a single processing unit or a number of processing units, and can include single or multiple computing units or multiple processing cores. The processor(s) 2028 can be implemented as one or more microprocessors, microcomputers, microcontrollers, digital signal processors, central processing units, state machines, logic circuitries, and/or any devices that manipulate signals based on operational instructions. For example, the processor(s) 2028 can be one or more hardware processors and/or logic circuits of any suitable type specifically programmed or configured to execute the algorithms and processes described herein. The processor(s) 2028 can be configured to fetch and execute computer-readable instructions stored in the computer-readable media 2030, which can program the processor(s) 2028 to perform the functions described herein.

The computer-readable media 2030 can include volatile and nonvolatile memory and/or removable and non-removable media implemented in any type of technology for storage of information, such as computer-readable instructions, data structures, program components, or other data. Such computer-readable media 2030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 2004, the computer-readable media 2030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2030 can be used to store any number of functional components that are executable by the processor(s) 2028. In many implementations, these functional components comprise instructions or programs that are executable by the processors 2028 and that, when executed, specifically configure the one or more processors 2028 to perform the actions attributed above to the service provider and/or payment processing service. Functional components stored in the computer-readable media 2030 can optionally include a merchant component 2036, a training component 2038, and one or more other components and data 2040.

The merchant component 2036 can be configured to receive transaction data from POS systems, e.g., as part of accessing identity data. The merchant component 2036 can transmit requests (e.g., authorization, capture, settlement, etc.) to payment service server computing device(s) to facilitate POS transactions between merchants and customers. The merchant component 2036 can communicate the successes or failures of the POS transactions to the POS systems.

The training component 2038 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 2002 and/or the server(s) 2004 for use at a time after the data models have been trained (e.g., at runtime).

The one or more other components and data 2040 can include decentralized identity techniques, the functionality of which is described, at least partially, above. Further, the one or more other components and data 2040 can include programs, drivers, etc., and the data used or generated by the functional components. Further, the server(s) 2004 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 2030 can additionally include an operating system 2042 for controlling and managing various functions of the server(s) 2004.

The communication interface(s) 2034 can include one or more interfaces and hardware components for enabling communication with various other devices, such as over the network(s) 2006 or directly. For example, communication interface(s) 2034 can enable communication through one or more network(s) 2006, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 2006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 2004 can further be equipped with various I/O devices 2032. Such I/O devices 2032 can include a display, various user interface controls (e.g., buttons, joystick, keyboard, mouse, touch screen, biometric or sensory input devices, etc.), audio speakers, connection ports and so forth.

In at least one example, the system 2000 can include a datastore 2044 that can be configured to store data that is accessible, manageable, and updatable. In some examples, the datastore 2044 can be integrated with the user device 2002 and/or the server(s) 2004. In other examples, as shown in FIG. 20, the datastore 2044 can be located remotely from the server(s) 2004 and can be accessible to the server(s) 2004. The datastore 2044 can comprise multiple databases and/or servers connected locally and/or remotely via the network(s) 2006.

In at least one example, the datastore 2044 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 2044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 2044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
generating a network of decentralized nodes individually configured to store, receive, and transmit data based on rules associated with the decentralized nodes;
associating a decentralized identity of an entity with a select decentralized node of the decentralized nodes, the select decentralized node including a personal datastore configured to control third party access via at least one application programming interface;
presenting a user interface including one or more access controls at an edge device, the access controls configuring rules to be applied to third-party access that specify a type of data to associate with a specific type of application programming interface and modification of decentralized identity data associated within the decentralized identity of the entity and stored at the selected decentralized node;
identifying the decentralized identity data accessible to the select decentralized node based on the rules;
storing the decentralized identity data within the decentralized identity associated with the entity at the select decentralized node; and
providing, based on the rules configured by the access controls, a third party service provider system, via the specific type of application programming interface, with one or more of access to the decentralized identity data or permission to modify the decentralized identity data stored at the decentralized node.

2. The method of claim 1, wherein the decentralized identity of the entity is accessible using a decentralized identifier implemented as part of a decentralized platform.

3. The method of claim 1, wherein the presenting of the user interface is performed through execution of an identity wallet at an edge device associated with the entity.

4. The method of claim 3, wherein the identity wallet is part of a cryptographic wallet that maintains one or more cryptographic keys.

5. The method of claim 1, wherein the user interface is further configured to receive inputs to specify an application programming interface, via which, the decentralized identity data is accessible.

6. The method of claim 1, wherein the identity data is associated with the specific type of the application programming interface automatically and without user intervention using a machine-learning model.

7. The method of claim 1, wherein the specific type of the application programming interface is accessible via a respective decentralized identifier of a plurality of decentralized identifiers.

8. The method of claim 1, wherein the user interface includes preconfigured identity data having rules that are user selectable for inclusion as part of the decentralized identity.

9. The method of claim 1, wherein the decentralized identity of the entity is accessible to a service provider system via an upload application programming interface to upload at least a part of the decentralized identity data to the selected decentralized node.

10. The method of claim 9, wherein the decentralized identity includes an option to permit inclusion of the uploaded decentralized identity data as part of the decentralized identity and publish the decentralized identity data as accessible via a respective application programming interface of the decentralized identity at the selected decentralized node.

11. The method of claim 1, wherein the decentralized nodes implement a shared resource, the decentralized identity is maintained as part of the shared resource and is executable as part of a distributed state machine.

12. The method of claim 1, wherein the permission to modify the decentralized identity data stored at the decentralized node further comprises permission to supplement the decentralized identity data.

13. A server of a service provider system, the server comprising:
a processing device; and
a computer-readable storage medium storing instructions that responsive to execution by the processing device causes the processing device to perform operations including:
receiving an identifier from an identity wallet maintained by an edge device associated with an entity;
querying an application programming interface of a decentralized identity maintained at a decentralized node using the identifier, the decentralized node including a personal datastore configured to control third party access via at least one application programming interface and included as part of a network of decentralized nodes individually configured to store, receive, and transmit data based on rules associated with the decentralized nodes;

receiving decentralized identity data from the decentralized node via the application programming interface; and storing the decentralized identity data in a computer-readable storage medium as associated with the entity.

14. The server of claim 13, wherein the decentralized nodes implement a decentralized platform and the decentralized identity is maintained as part of the decentralized platform.

15. The server of claim 14, wherein the identifier is a decentralized identifier.

16. The server of claim 13, further comprising causing transmission of a query signal by the server, the query signal configured to cause the edge device to communicate the identifier from the identity wallet.

17. A method comprising:

displaying, by an edge device, a user interface configured to generate a decentralized identity;

receiving, by the edge device, a plurality of inputs specifying a plurality of types of decentralized identity data and a plurality of application programming interfaces, via which, the plurality of types of the decentralized identity data is accessible; and forming a communication for communication to a decentralized node including a personal datastore configured to control third party access via at least one application programming interface and included as part of a network of decentralized nodes individually configured to store, receive, and transmit data based on rules associated with the decentralized nodes that specify a type of data to associate with a specific type of application programming interface, the communication configured to cause the decentralized node to maintain the decentralized identity, via which, the decentralized identity data is made available via respective application programming interfaces of the plurality of application programming interfaces.

18. The method of claim 17, wherein the displaying of the user interface is performed through execution of an identity wallet at the edge device.

19. The method of claim 17, wherein each of the plurality of application programming interfaces are accessible via a respective decentralized identifier.

20. The method of claim 17, wherein the plurality of decentralized nodes implements a decentralized platform and the decentralized identity is maintained as part of the decentralized platform.

* * * * *